(12) United States Patent
Brozek et al.

(10) Patent No.: US 12,170,450 B2
(45) Date of Patent: Dec. 17, 2024

(54) SYSTEMS AND METHODS FOR IDENTIFYING A BATTERY PACK FOR A BATTERY PACK POWERED POWER TOOL

(71) Applicant: MILWAUKEE ELECTRIC TOOL CORPORATION, Brookfield, WI (US)

(72) Inventors: Jeffrey M. Brozek, Mequon, WI (US); Matthew R. Polakowski, Greenfield, WI (US); James K. Dykstra, Milwaukee, WI (US); Paul C. Chao, Menomonee Falls, WI (US); Andrew J. Spaulding, Racine, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/530,747

(22) Filed: Nov. 19, 2021

(65) Prior Publication Data

US 2022/0166235 A1  May 26, 2022

Related U.S. Application Data

(60) Provisional application No. 63/116,273, filed on Nov. 20, 2020.

(51) Int. Cl.
*H02J 7/00* (2006.01)
(52) U.S. Cl.
CPC ........ *H02J 7/00043* (2020.01); *H02J 7/0013* (2013.01); *H02J 7/0047* (2013.01); *H02J 7/00714* (2020.01)
(58) Field of Classification Search
CPC .. H02J 7/00043; H02J 7/00714; H02J 7/0013; H02J 7/0047
See application file for complete search history.

(56) References Cited

U.S. PATENT DOCUMENTS 5,565,756 A  10/1996  Urbish et al.
5,608,306 A   3/1997  Rybeck et al.
(Continued)

FOREIGN PATENT DOCUMENTS

CN  103268965 B  7/2015
CN  105846000 A  8/2016
(Continued)

OTHER PUBLICATIONS

International Search Report and Written Opinion for Application No. PCT/US2021/060034 dated Mar. 14, 2022 (14 pages).
(Continued)

*Primary Examiner* — Lincoln D Donovan
*Assistant Examiner* — James G Yeaman
(74) *Attorney, Agent, or Firm* — Michael Best & Friedrich LLP

(57) ABSTRACT

Systems described herein include a battery pack including one or more battery cells and a first resistive element connected to a positive electrode of a first battery cell. The systems also include an external device capable of receiving the battery pack. The external device includes a second resistive element, a switch, and a controller. The second resistive element is configured to be in series with the first resistive element upon the battery pack being received within the external device. The switch is positioned in series with the second resistive element and a common potential is coupled to both the battery pack and the external device. The controller is configured to activate the switch, measure a voltage between the first resistive element and the second resistive element in response to the switch being activated, and determine an identification of the battery pack based on the measured voltage.

19 Claims, 19 Drawing Sheets

(56) References Cited

U.S. PATENT DOCUMENTS

| | | | |
|---|---|---|---|
| 5,696,433 A | 12/1997 | Patino | |
| 5,945,803 A * | 8/1999 | Brotto | H01M 10/443 320/110 |
| 5,999,410 A | 12/1999 | Weiler | |
| 6,175,211 B1 | 1/2001 | Brotto | |
| 6,215,274 B1 | 4/2001 | Dotzler | |
| 6,362,596 B1 | 3/2002 | Brotto | |
| 6,504,341 B2 | 1/2003 | Brotto | |
| 6,577,883 B1 | 6/2003 | Ueda | |
| 6,747,436 B2 | 6/2004 | Brotto | |
| 7,659,692 B2 | 2/2010 | Sainomoto et al. | |
| 7,952,326 B2 | 5/2011 | Johnson et al. | |
| 8,093,859 B2 | 1/2012 | Aradachi et al. | |
| 8,251,157 B2 | 8/2012 | Gray et al. | |
| 8,319,475 B2 * | 11/2012 | Choksi | B25F 5/00 320/110 |
| 8,912,749 B2 | 12/2014 | Kuo et al. | |
| 9,239,772 B2 * | 1/2016 | Leinonen | G06F 1/26 |
| 9,444,269 B2 * | 9/2016 | Wohltmann | H01L 25/0655 |
| 9,878,432 B2 | 1/2018 | Linehan et al. | |
| 10,530,167 B2 * | 1/2020 | Yi | H02J 7/0029 |
| 10,553,915 B1 | 2/2020 | Li | |
| 2003/0062872 A1 | 4/2003 | Brotto | |
| 2006/0087285 A1 | 4/2006 | Phillips et al. | |
| 2008/0238357 A1 | 10/2008 | Bourilkov et al. | |
| 2008/0309285 A1 | 12/2008 | Choksi et al. | |
| 2009/0087729 A1 | 4/2009 | Johnson et al. | |
| 2013/0087624 A1 | 4/2013 | Bertness et al. | |
| 2013/0197746 A1 * | 8/2013 | Glueck | B64D 11/06205 701/34.4 |
| 2014/0262389 A1 | 9/2014 | Simeone et al. | |
| 2015/0143999 A1 * | 5/2015 | Cross | A47J 31/0605 426/112 |
| 2020/0106081 A1 * | 4/2020 | Suzuki | H01M 10/44 |
| 2020/0233658 A1 | 7/2020 | Yang et al. | |
| 2020/0242436 A1 | 7/2020 | Yang et al. | |
| 2020/0295408 A1 | 9/2020 | Yang et al. | |
| 2020/0300923 A1 * | 9/2020 | Li | G01R 31/72 |
| 2020/0301696 A1 | 9/2020 | Yang et al. | |

FOREIGN PATENT DOCUMENTS

| | | | | |
|---|---|---|---|---|
| CN | 205646881 U | 10/2016 | | |
| CN | 208257482 U | 12/2018 | | |
| CN | 208539591 U | 2/2019 | | |
| CN | 109473736 A | 3/2019 | | |
| CN | 111136620 A | 5/2020 | | |
| CN | 211376863 U | 8/2020 | | |
| DE | 9103661 U1 | 6/1991 | | |
| JP | H0765864 A | 3/1995 | | |
| JP | 2001522124 A | 11/2001 | | |
| JP | 2009090419 A * | 4/2009 | | |
| WO | WO-2019078589 A1 * | 4/2019 | | H01M 10/425 |
| WO | 2019201256 A1 | 10/2019 | | |

OTHER PUBLICATIONS

Japanese Patent Office Action for Application No. 2023-529886 dated May 28, 2024 (15 pages including English translation).
Partial Supplementary European Search Report for Application No. 21895648.0 dated Sep. 18, 2024 (11 pages).
Japanese Patent Office Action for Application No. 2023-529886 dated Sep. 10, 2024 (15 pages including English translation).

* cited by examiner

SYSTEMS AND METHODS FOR IDENTIFYING A BATTERY PACK FOR A BATTERY PACK POWERED POWER TOOL

RELATED APPLICATIONS

This application claims the benefit of, and priority to, U.S. Provisional Patent Application No. 63/116,273 filed Nov. 20, 2020, the contents of which are incorporated herein in their entirety.

FIELD

This disclosure relates to power tool battery pack identification systems and methods.

SUMMARY

Power tool battery packs, such as lithium-ion battery packs, generally have intelligence built in to manage charging and discharging of the cells within the battery pack, as well as for providing battery pack information to devices such as power tools and battery chargers. However, some battery packs, such as those with smaller form factors (e.g., 12V battery packs), may not have the same intelligence that is contained within other battery packs. These smaller, lower voltage battery packs may still have different configurations, such as high-capacity battery packs, fast discharge battery packs, etc. However, without the intelligence, it is difficult to inform the device being powered by the battery packs what features or parameters are available, or the configuration of the battery pack. Thus, the systems and methods described herein relate to various battery pack identification techniques that provide an indication to a device as to certain parameters or features of the battery pack.

Battery pack systems described herein include a battery pack including one or more battery cells and a first resistive element connected to a positive electrode of a first battery cell of the one or more battery cells. The systems also include an external device capable of receiving the battery pack. The external device includes a second resistive element, a switch, and a controller. The second resistive element is configured to be in series with the first resistive element upon the battery pack being received by the external device. The switch is positioned in series with the second resistive element and a common potential is coupled to both the battery pack and the external device. The controller is configured to activate the switch, measure a voltage between the first resistive element and the second resistive element in response to the switch being activated, and determine an identification of the battery pack based on the measured voltage.

Battery pack systems described herein include a battery pack including one or more battery cells, a thermistor, and a capacitor connected in parallel with the thermistor. The systems also include an external device configured to receive the battery pack. The external device includes a resistive element and a controller. The resistive element is configured to be in series with the thermistor and the capacitor upon the battery pack being received by the external device. The controller is configured to provide a current to the resistive element, the thermistor, and the capacitor, measure a voltage between the resistive element and the thermistor, determine a time for the voltage to exceed a predetermined threshold, and determine an identity of the battery pack based on the determined time.

Battery packs described herein include an identification circuit configured to provide an indication of an identity of the battery pack to an external device configured to be electrically coupled to the battery pack. The battery pack has a nominal voltage output of less than 18 V.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the invention will become apparent by consideration of the detailed description and accompanying drawings.

DETAILED DESCRIPTION

Figure 1:
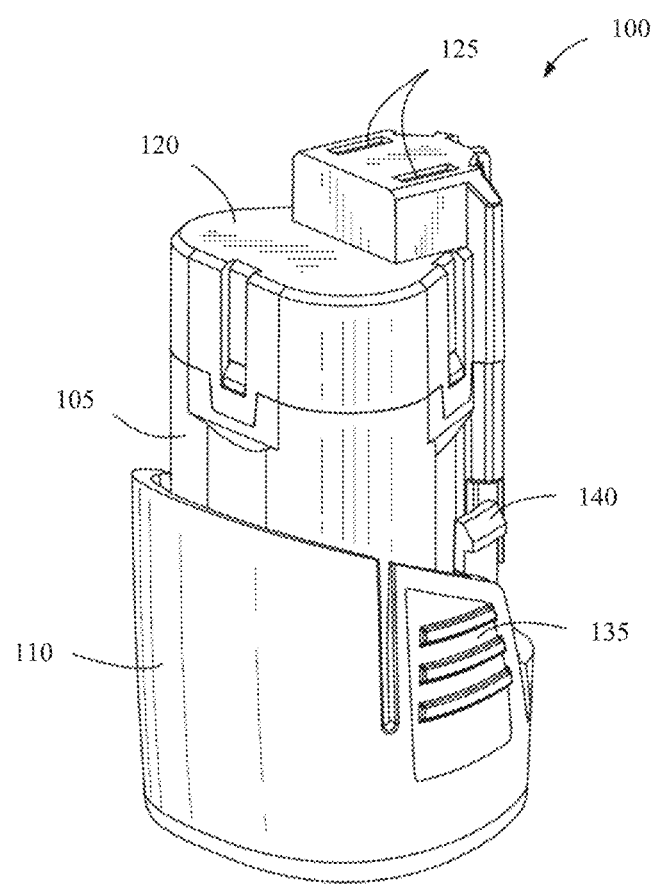
FIGS. 1-3 illustrate a battery pack for a hand-held power tool, according to some embodiments.
Figure 2:
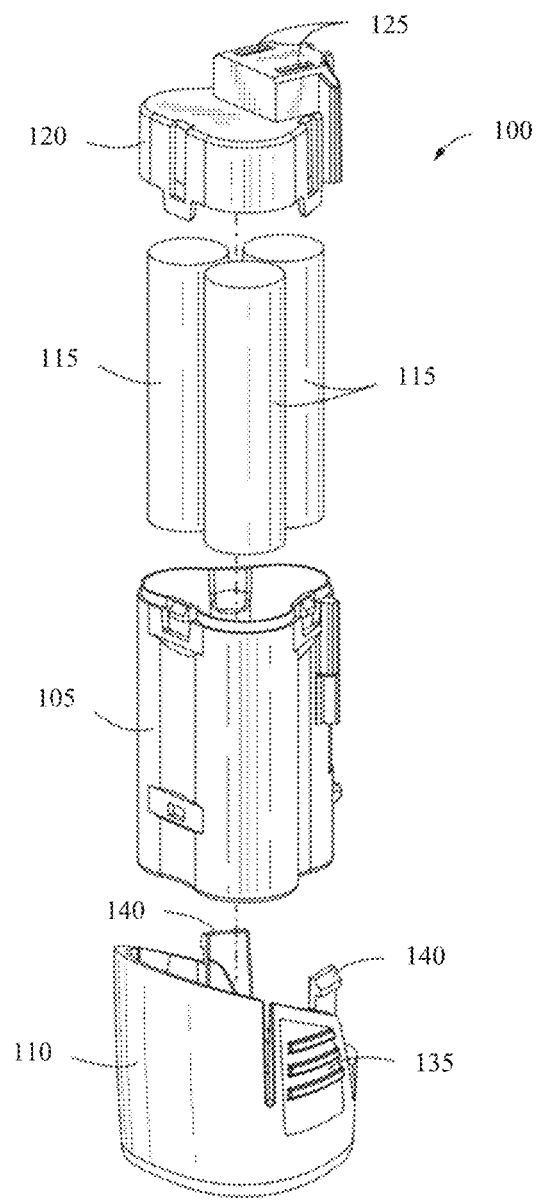
Figure 3:
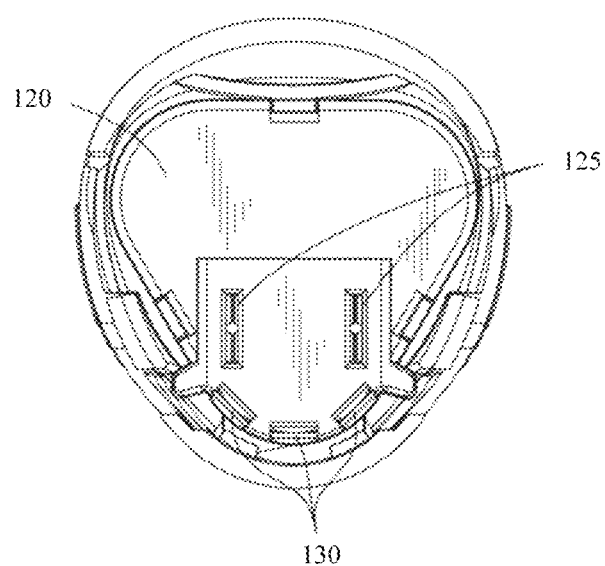

FIGS. 1-3 illustrate a battery pack 100 that is configured to be used with hand-held power tools. The battery pack 100 is removably and interchangeably connected to a hand-held power tool to provide operational power to the hand-held power tool. In the embodiment illustrated in FIGS. 1-3, the battery pack 100 has one or more battery cells 115. The battery cells 115 can be arranged in series, parallel, or a series-parallel combination. For example, the battery pack 100 can include a total of three battery cells 115 configured in a series arrangement. However, other combinations of battery cells 115 are also contemplated. For example, in other embodiments, the battery pack 100 may include a different number of battery cells 115, which may be connected in series, parallel, or a series-parallel combination in order to produce a battery pack having a desired combination of nominal battery pack voltage and battery capacity.

The illustrated battery cells 115 are, for example, cylindrical 18650 battery cells (18 mm diameter and 65 mm length), such as the INR18650-15M lithium-ion rechargeable battery cell manufactured and sold by Samsung SDI Co., Ltd. of South Korea. In other embodiments, the battery cells 115 are, for example, cylindrical 14500 battery cells (14 mm diameter and 50 mm length), 14650 battery cells (14 mm diameter and 65 mm length), 17500 battery cells (17 mm diameter and 50 mm length), 17670 battery cells (17 mm diameter and 67 mm length), 18500 battery cells (18 mm diameter and 50 mm length), 26650 battery cells (26 mm diameter and 65 mm length), 26700 battery cells (26 mm diameter and 70 mm length), etc. Each battery cell 115 can be generally cylindrical and can extend along the cell axis 1035 parallel to the cylindrical outer cell wall.

The battery cells 115 are lithium-based battery cells having a chemistry of, for example, lithium-cobalt ("Li—Co"), lithium-manganese ("Li—Mn"), or Li—Mn spinel. In some embodiments, the battery cells 115 have other suitable lithium or lithium-based chemistries, such as a lithium-based chemistry that includes manganese, etc. The battery cells 115 within the battery pack 100 provide operational power (e.g., voltage and current) to the power tools. In some embodiments, each battery cell 115 has a nominal voltage of approximately 3.6V, such that the battery pack 100 has a nominal voltage of approximately 12V. In other embodiments, the battery cells 115 have different nominal voltages, such as, for example, between 3.6V and 4.2V, and the battery pack 100 has a different nominal voltage, such as, for example, 10.8V, 12V, 14.4V, under 18V, etc. The battery cells 115 also have a capacity of, for example, approximately between 1.0 ampere-hours ("Ah") and 8.0 Ah. In exemplary embodiments, the battery cells 115 have capacities of approximately, 1.5 Ah, 2.4 Ah, 3.0 Ah, 4.0 Ah, between 1.5 Ah and 8.0 Ah, etc.

The battery pack 100 includes a casing 105, an outer housing 110 coupled to the casing 105, and the plurality of battery cells 115 (see FIG. 2) positioned within the casing 105. The casing 105 is shaped and sized to fit within an opening and cavity in a hand-held power tool. For example, a recess for receiving the battery pack 100 similar to those disclosed in the devices in U.S. Pat. No. 8,251,157, issued Aug. 28, 2012, and entitled "BATTERY PACK FOR USE WITH A POWER TOOL AND A NON-MOTORIZED SENSING TOOL," the entire content of which is hereby incorporated by reference, can be used. The casing 105 includes an end cap 120 to substantially enclose the battery cells 115 within the casing 105. The illustrated end cap 120 includes two power terminals 125 configured to mate with corresponding power terminals extending from a hand-held power tool. In other embodiments, the end cap 120 may include terminals that extend from the battery pack 100 and are configured to be received in receptacles supported by a hand-held power tool. The end cap 120 also includes sense or communication terminals 130 (shown in FIG. 3) that are configured to mate with corresponding terminals from a hand-held power tool. The casing 105 and the receptacles substantially enclose and cover the terminals on the tool when the battery pack 100 is positioned within the opening. That is, the battery pack 100 functions as a cover for the opening and terminals of the hand-held power tool. Once the battery pack 100 is disconnected from the hand-held power tool and the casing 105 is removed from the opening, the battery terminals on the hand-held power tool are generally exposed to the surrounding environment.

The outer housing 110 is coupled to an end of the casing 105 substantially opposite the end cap 120 and surrounds a portion of the casing 105. In the illustrated construction, when the casing 105 is inserted into or positioned at least partially within the corresponding opening in the hand-held power tool, the outer housing 110 generally aligns with an outer surface of the hand-held power tool. In this embodiment, the outer housing 110 is designed to substantially follow the contours of the hand-held power tool to match the general shape of the outer casing of the handle of the hand-held power tool. In some embodiments, the casing 105 is at least partially inserted into a grip of a hand-held power tool. In such embodiments, the outer housing 110 generally increases (e.g., extends) the length of the grip of the tool (i.e., the portion of the power tool below the main body).

In the illustrated embodiment, two actuators 135 (only one of which is shown) and two tabs 140 are formed in the outer housing 110 of the battery pack 100. The actuators 135 and the tabs 140 define a coupling mechanism to releasably secure the battery pack 100 to hand-held power tool. Each tab 140 engages a corresponding recess formed in a hand-held power tool to secure the battery pack 100 in place. The tabs 140 are normally biased away from the casing 105 (i.e., away from each other) due to the resiliency of the material forming the outer housing 110. Actuating (e.g., depressing) the actuators 135 moves the tabs 140 toward the casing 105 (i.e., toward each other) and out of engagement with the recesses such that the battery pack 100 may be pulled out of the opening and away from the hand-held power tool. In some embodiments, a single tab and actuator are included in the battery pack 100.

As shown in FIG. 2, the battery pack 100 includes three battery cells 115 positioned within the casing 105 and electrically coupled to the terminals 125. The battery cells 115 provide operational power (e.g., DC power) to a hand-held power tool. In the illustrated embodiment, the battery cells 115 are arranged in series, and each battery cell 115 has a nominal voltage of approximately 3.6V-4.2V, such that the battery pack 100 has a nominal voltage of approximately twelve volts (12V).

Figure 4:
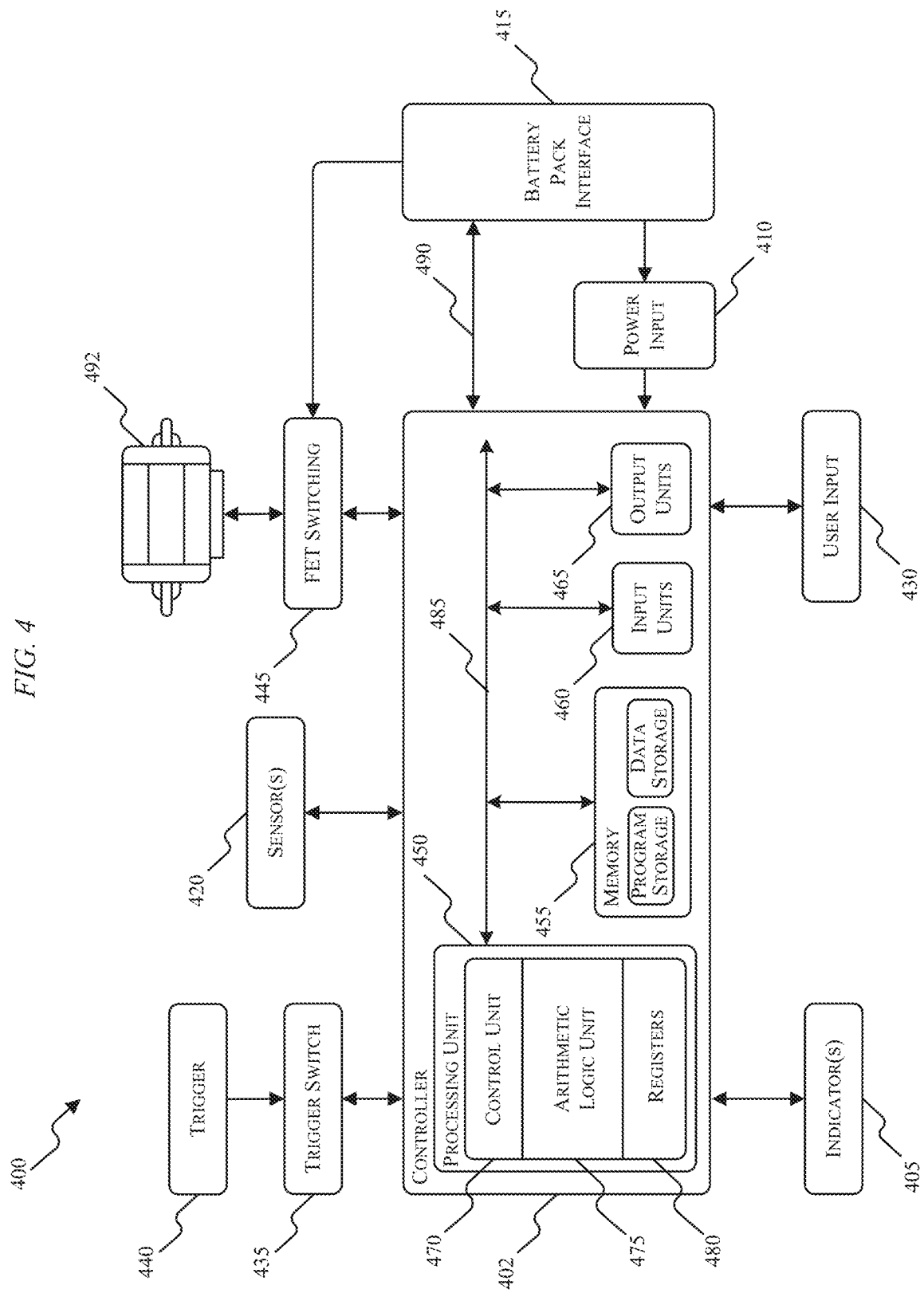
FIG. 4 illustrates electronic circuitry for a hand-held power tool, according to some embodiments.

The power provided by the battery pack 100 to a hand-held power tool is controlled, monitored, and regulated using control electronics within the hand-held power tool and within the battery pack 100, as illustrated in the electromechanical diagram of FIG. 4.

FIG. 4 illustrates an example hand-held power tool control circuit 400 associated with a hand-held power tool. The hand-held power tool control circuit 400 includes a controller 402 associated with a hand-held power tool. It is understood that the hand-held power tool may be referred to as simply a "power tool." It is also understood that the hand-held power tool may also be a battery charger, and that the two may be used interchangeably herein, unless otherwise noted. The controller 402 is electrically and/or communicatively connected to a variety of modules or components of the hand-held power tool. For example, the illustrated controller 402 is connected to one or more indicators 405, a power input module 410, a battery pack interface 415, one or more sensors 420, a user input module 430, a trigger switch 435 (connected to trigger 440), and a FET switching module 445. In some embodiments, the trigger switch 435 is combined and integral with the controller 402 within a housing within the hand-held power tool. The controller 402 includes combinations of hardware and software that are operable to, among other things, control the operation of the hand-held power tool, monitor the operation of the hand-held power tool, determine an identity of a battery pack, etc. The one or more sensors 420 include, among other things, one or more temperature sensors, one or more Hall Effect sensors, etc.

In some embodiments, the controller 402 includes a number of electrical and electronic components that provide power, operational control, and protection to the components and modules within the controller 402 and/or hand-held power tool. For example, the controller 402 includes, among other things, a processing unit 450 (e.g., a microprocessor, a microcontroller, an electronic processor, an electronic controller, or another suitable programmable device), a memory 455, input units 460, and output units 465. The processing unit 450 includes, among other things, a control unit 470, an arithmetic logic unit ("ALU") 475, and a plurality of registers 480 (shown as a group of registers in FIG. 4), and is implemented using a known computer architecture, such as a modified Harvard architecture, a von Neumann architecture, etc. The processing unit 450, the memory 455, the input units 460, and the output units 465, as well as the various modules connected to the controller 402 are connected by one or more control and/or data buses (e.g., common bus 485). The control and/or data buses are shown generally in FIG. 4 for illustrative purposes. The use of one or more control and/or data buses for the interconnection between and communication among the various modules and components would be known to a person skilled in the art in view of the invention described herein.

The memory 455 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 450 is connected to the memory 455 and executes software instructions that are capable of being stored in a RAM of the memory 455 (e.g., during execution), a ROM of the memory 455 (e.g., on a generally permanent basis), or another non-transitory computer readable medium such as another memory or a disc. Software included in the implementation of the hand-held power tool can be stored in the memory 455 of the controller 402. The software includes, for example, firmware, one or more applications, program data, filters, rules, one or more program modules, and other executable instructions. The controller 402 is configured to retrieve from memory 455 and execute, among other things, instructions related to the control processes and methods described herein. In other constructions, the controller 402 includes additional, fewer, or different components.

The battery pack interface 415 includes a combination of electrical and mechanical components configured to and operable for interfacing (e.g., mechanically, electrically, and communicatively connecting) a hand-held power tool with a battery pack (e.g., battery pack 100). For example, power provided by the battery pack 100 to a hand-held power tool is provided through the battery pack interface 415 to a power input module 410. The power input module 410 includes combinations of active and passive components to regulate or control the power received from the battery pack 100 prior to power being provided to the controller. The battery pack interface 415 also supplies power to the FET switching module 445 to be switched by the switching FETs to selectively provide power to a motor 492. In some embodiments, the battery pack interface 415 also includes, for example, an input line or communication line 490 for provided a link between the controller 402 and the battery pack 100.

The user input module 430 is operably coupled to the controller 402 to, for example, select a forward mode of operation or a reverse mode of operation, a torque and/or speed settings for the hand-held power tool (e.g., using the torque and/or speed switches), etc. In some embodiments, the user input module 430 includes a combination of digital and analog input or output devices required to achieve a desired level of operation for the hand-held power tool, such as one or more knobs, one or more dials, one or more switches, one or more buttons, etc.

In some implementations, it is advantageous for a power tool, or a battery charger, to know what type of battery pack is coupled to the power tool. In some implementations, a battery pack may include a controller or other intelligent circuitry, which can be used to communicate an identity of the battery, along with other data, to a power tool when the battery pack is coupled to the power tool. However, some battery packs, such as those described herein, do not include a controller for providing information to the power tool and/or charger. Accordingly, the below implementations describe various configurations to allow for an identity of a battery pack to be provided to a power tool and/or battery charger.

In some specific implementations, understanding the identity of a battery pack may include understanding a power capacity of the battery pack. For example, while multiple battery packs may put out a constant voltage level (e.g., 12V), different battery packs may have different power availability (e.g., amp-hour capacity) than other battery packs. By allowing a power tool to recognize an identity of a battery pack, the power tool may be able to optimize one or more operations to improve performance for a user based on various parameters associated with the battery pack (e.g., power rating, amp-hour capacity, etc.). For example, by the power tool knowing an identity/power rating of a battery, the power tool may optimize performance by adjusting current draw to prevent an overtemperature condition of the battery pack and/or the tool. Other optimizations may include varying a soft start operation based on the pack identity to increase peak torque for more powerful battery packs, improve runtime on long duration/low current applications (e.g., lighting devices), faster firing rate on pneumatic type tools (e.g., nailers, staplers, etc.), limiting output power to prevent damage to mechanical mechanisms, etc.

Additionally, understanding the identity of a battery pack may allow a charger to optimize charging of the battery pack. For example, a charger can be configured to charge certain battery pack types (e.g., higher power battery packs) faster than other battery pack types (e.g., low power battery packs). Additionally, by understanding an identity of a battery pack being charged, a charger can log which types of battery packs have been charged over time.

Figure 5:
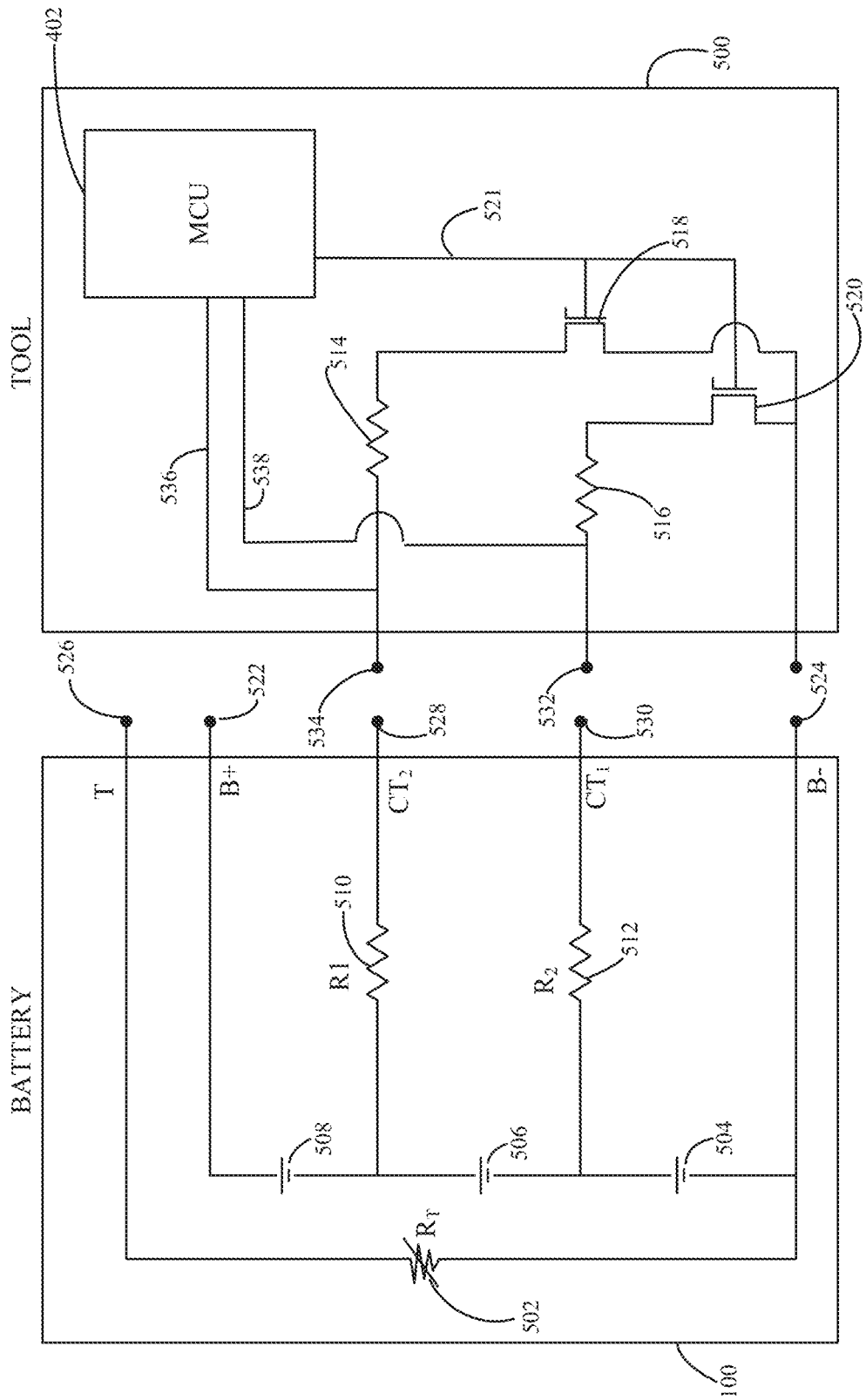
FIG. 5 illustrates electronic circuitry for identifying a battery pack, according to some embodiments.

Turning now to FIG. 5, an electrical circuit for determining an identity of a battery pack, such as battery pack 100 by a power tool 500 is shown, according to some embodiments. While the embodiment of FIG. 5 is described as being a coupling of the battery pack 100 to the power tool 500, it is understood that the power tool 500 could be replaced by a battery charger configured to charge the battery pack 100. In some embodiments, the battery pack 100 and the power tool 500 include a number of electrical components that are combined with a controller of the power tool 500, such as controller 402, to determine an identity of a battery pack 100.

The battery pack 100 includes a thermistor 502, a number of battery cells 504, 506, 508, a first identification resistor 510 and a second identification resistor 512. In one example, the battery cells 504, 506, 508 may be similar to battery cells 115 described above. The power tool 500 includes a controller, such as controller 402 described above, a first divider resistor 514, a second divider resistor 516, a first switch 518, and a second switch 520. The first switch 518 and the second switch 520 are coupled to, and controlled by, the controller 402 via control line 521. The battery pack 100 couples power to the power tool 500 via a positive power terminal 522 and a common voltage terminal 524. The battery pack 100 may further include a temperature terminal 526, a first voltage tap terminal 528, and a second voltage tap terminal 530. The first voltage tap terminal 528 and the second voltage tap terminal 530 output a voltage of the first cell 504 and a combination of the first cell 504 and the second cell 506, respectively. The first voltage tap terminal 528 couples to a first terminal 532 on the power tool 500 and the second voltage tap terminal 530 couples to a second terminal 534 on the power tool 500. In one embodiment, the switches may be solid state switches (e.g., MOSFET, BJT, IGBT, etc.) or electro-mechanical switches, such as relays.

As will be described in more detail below, the controller 402 is configured to momentarily activate one or both of the first switch 518 and the second switch 520 ON (e.g., to conduct current through the switch), to create a voltage divider circuit between the identification resistors 510, 512, and the divider resistors 514, 516, respectively. A voltage between the first identification resistor 510 and the first dividing resistor 514, having divided the combined voltage of the first cell 504 and the second cell 506, is provided to the controller 402 via connection line 536 when the first switch 518 is switched ON, thereby closing the circuit. Similarly, a voltage between the second identification resistor 512 and the second divider resistor 516, having divided the voltage of the first cell 504 is provided to the controller 402 via a connection line 538 when the second switch 520 is ON (e.g., providing a path to the common voltage terminal 524), thereby closing the circuit.

While FIG. 5 illustrates two separate voltage divider circuits (first identification resistor 510 and the first dividing resistor 514, and second identification resistor 512 and the second divider resistor 516), it is contemplated that only the voltage divider circuit formed by the second identification resistor 512 and the second divider resistor 516 may be used in identifying the battery pack 100, in some implementations. In other implementations, it is contemplated that only the voltage divider circuit formed by the first identification resistor 510 and the first dividing resistor is used in identifying the battery pack 100.

Figure 6:
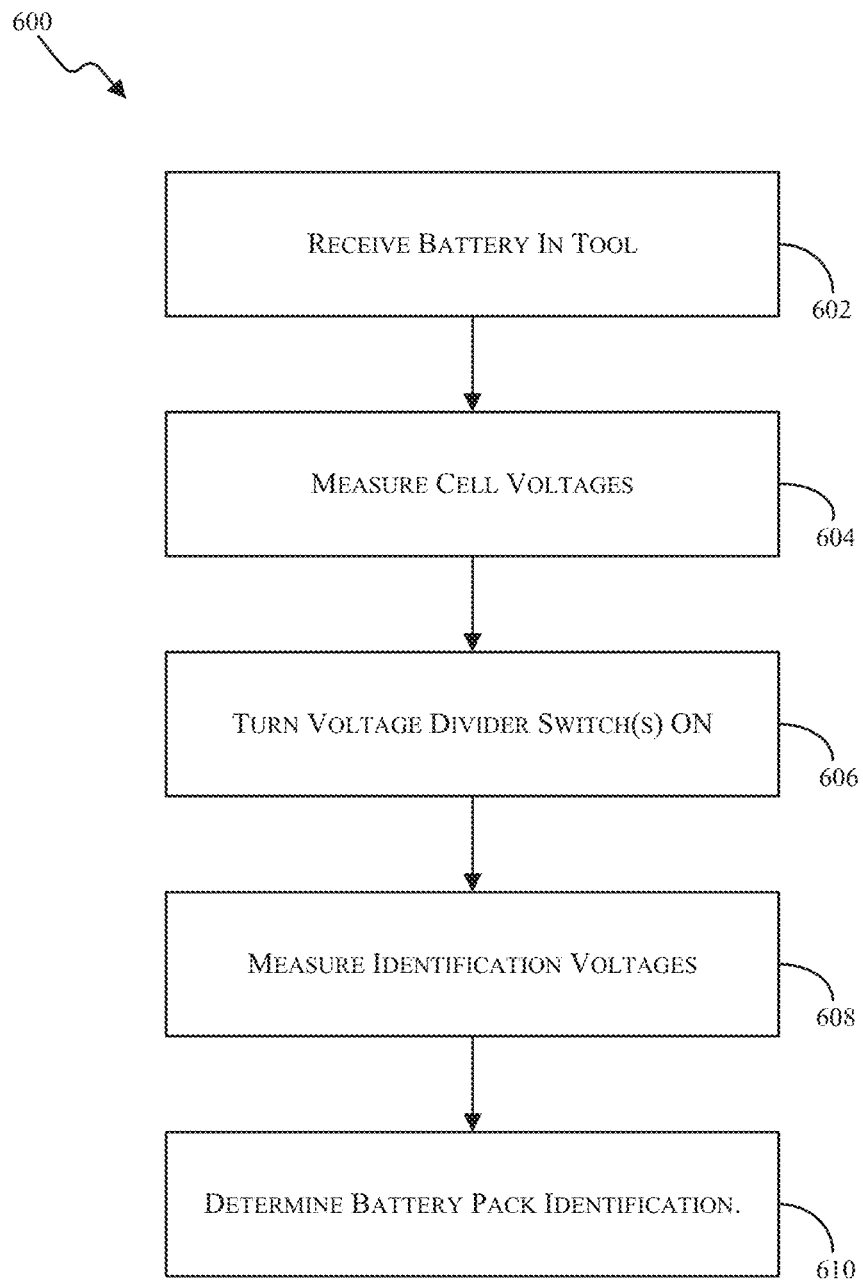
FIG. 6 is a flow chart illustrating a process for identifying a battery pack using the electronic circuitry of FIG. 5, according to some embodiments.

FIG. 6 illustrates a process 600 for identifying a battery using a resistive voltage divider circuit, such as using the circuitry described in FIG. 5, according to some embodiments. At process block 602, a battery pack, such as battery pack 100, is received into a power tool, such as power tool 500 and/or a battery charger. For example, the battery pack 100 may be received into battery pack interface 415 of a power tool and/or battery charger, as described above. In some embodiments, receiving the battery pack 100 into a power tool and/or battery charger is performed when an electrical and a mechanical coupling of the battery pack 100 and the power tool is achieved. However, in other embodiments, receiving the battery pack 100 into a power tool is achieved when the battery pack 100 and the power tool are electrically coupled.

At process block 604, the controller 402 measures one or more cell voltages of the battery pack 100. For example, the controller 402 may measure the total battery pack 100 voltage. The individual cell voltages may then be estimated by dividing the total battery pack 100 voltage by three (the number of series connected cells in battery pack 100). In other embodiments, the controller 402 may measure the voltage at one or more the positive terminal 522, the first voltage tap terminal 528 and the second voltage tap terminal 530. In some embodiments, the controller 402 may not measure the cell voltages until later in the process 600, or at all. At process block 606, the controller 402 activates one or more switches to create one or more voltage divider circuits. For example, the controller may activate one or more of the first switch 518 and the second switch 520. As noted above, in some embodiments, only a single voltage divider circuit is used to identify the battery pack 100. In other embodiments, two (or more) voltage divider circuits may be used to identify the battery pack 100. Where only one voltage divider circuit is used, the number of possible identifications of the battery pack 100 may be limited. For example, as the voltage of a single cell is approximately 3.6V, the number of divided voltages may be limited by the sensitivity of the voltage sensing circuitry, as well as the precision of the resistive elements. In one embodiment, the cell voltage may be divided into seven different identification values, equaling approximately 0.5V per identification value. Thus, for a system having more than one voltage divider circuit, or where the divided voltage is the sum of two battery cells, the number of identification values may be fourteen. However, other quantities of identification values are contemplated, and may be accomplished using high precision resistors and/or high sensitivity voltage sensing circuitry or components.

At process block 608, the controller 402 measures one or more voltages, as described above. For example, the controller 402 may measure a first voltage via the connection line 538 and a second voltage via the connection line 536. In some examples, only one voltage is measured by the controller 402. For example, in some embodiments, there may only be one voltage divider circuit, such as the voltage divider circuit made up of the second identification resistor 512, the second dividing resistor 516 and the second switch 520 or the voltage divider circuit made up of the first identification resistor 510, the first dividing resistor 514, and the first switch 518.

As noted above, by the controller 402 activating the first switch 518 and/or the second switch 520, a voltage is induced due to the current flow through the identification resistors 510, 512 and the dividing resistors 514, 516. For example, where the first switch 518 is switched ON, current flows from the first battery cell 504 and the second battery cell 506 (collectively $V_{cell1}$) and through the first identification resistor (R1) 510 and the first dividing resistor 514 (R3). A divided voltage ($V_{d1}$) is induced at the first connection line 536 equal to:

$$V_{d1} = V_{cell1} * \frac{R3}{R1 + R3}.$$

Similarly, where the second switch 520 is switched ON, current flows from the first battery cell 504 ($V_{cell2}$) and through the second identification resistor 512 (R2) and the second dividing resistor 516 (R4). A divided voltage ($V_{d2}$) is induced at the second connection line 538 equal to:

$$V_{d2} = V_{cell2} * \frac{R4}{R2 + R4}.$$

At process block 610 the controller 402 determines an identity of the battery pack 100 based on the measured voltage, such as $V_{d1}$ and/or $V_{d2}$. The controller 402 may access a lookup table stored in the memory 455 to determine an identity of the battery pack 100 based on the measured voltage(s). For example, assuming the cell voltages are equal to 3.6 volts, the controller 402 may have battery pack identities stored in the memory 455 that are equal to a number of voltages between 0V and 3.6V. Thus, a measured divided voltage of 2.5V may indicate a first battery identification, while a measured divided voltage of 1.5V may indicate a second battery identification. As noted above, the number of possible identifications depend on factors such as the sensitivity of the voltage measurement circuit, the precision of the resistors (e.g., dividing resistors 514, 516, and the identification resistors 510, 512), and the like. Further, fluctuation in the battery cell voltages may also impact the number of identification values that may be used. Upon determining the battery pack identification, the tool and/or charger may modify one or more operations, as described above.

Figure 7:
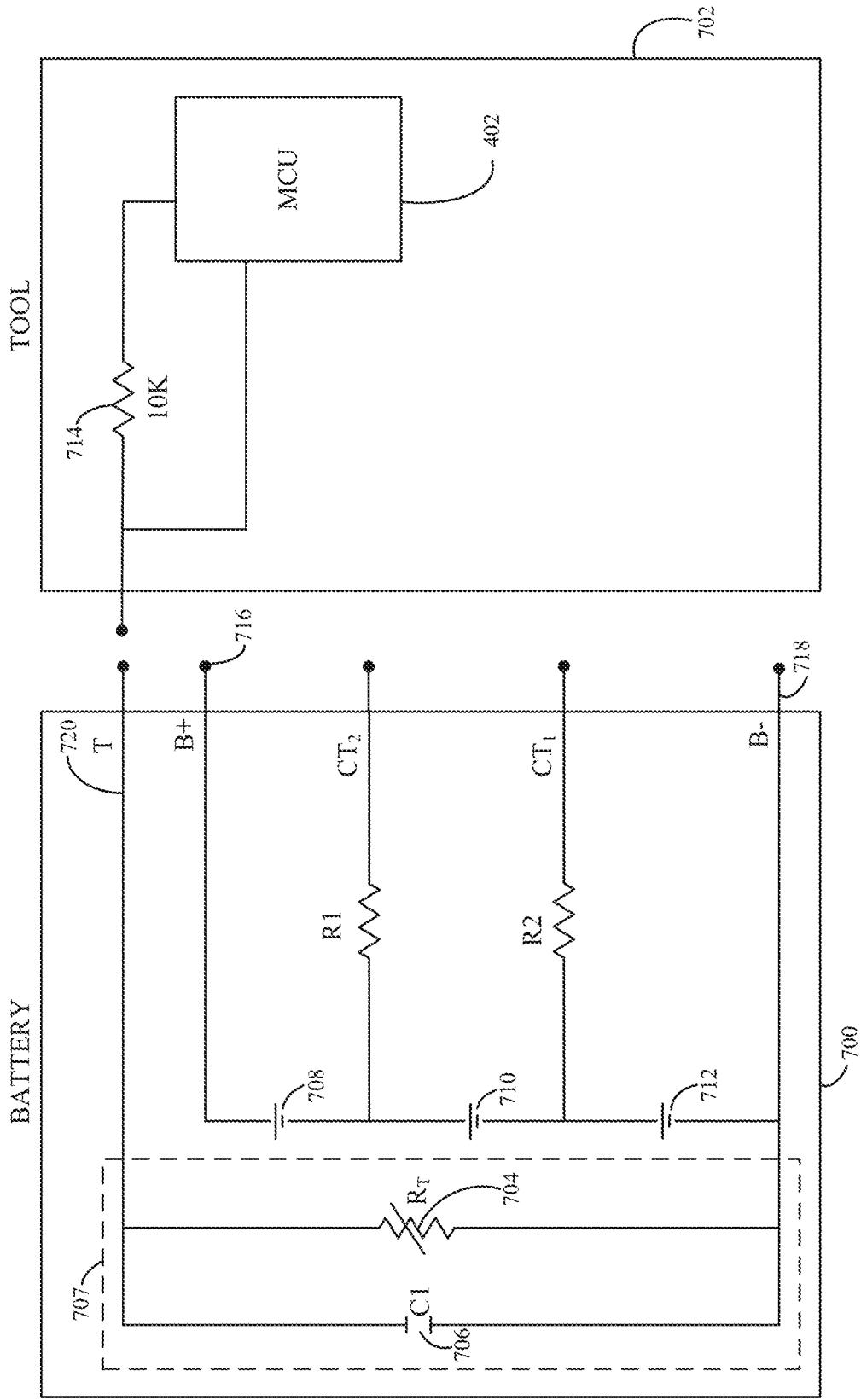
FIG. 7 illustrates electronic circuitry for identifying a battery pack, according to some embodiments.

FIG. 7 is an electrical circuit including a battery pack 700, similar to the battery pack 100 described above, coupled to a hand-held power tool 702 and configured to determine an identity of the battery pack 700, according to some embodiments. While the battery pack 700 is shown as connected to a power tool 702, it is contemplated that the power tool 702 may be a battery charger device, as described above. Similarly, the power tool 702 may include similar components to power tool 400 described above. In some embodiments, the battery pack 700 and the power tool 702 include a number of electrical components that are combined with a controller 402 of the power tool 702 to determine an identity of the battery pack 100.

The battery pack 700 includes a thermistor 704 in parallel with an identification capacitor 706 forming a thermistor circuit 707, and a number of battery cells 708, 710, 712. In one example, the battery cells 708, 710, 712 are similar to battery cells 115 described above. The power tool 702 includes the controller 402 and a discharge resistor 714. The battery pack 700 couples power to the power tool 702 via at least a positive power terminal 716, a negative power terminal 718, and a temperature terminal 720. In one embodiment, the controller 402 is configured to provide power to the thermistor circuit 707, as well as to allow for the thermistor 704 and the associated identification capacitor 706 to discharge. The controller 402 is further configured to determine a voltage of the identification capacitor 706 at temperature terminal 720.

Figure 8:
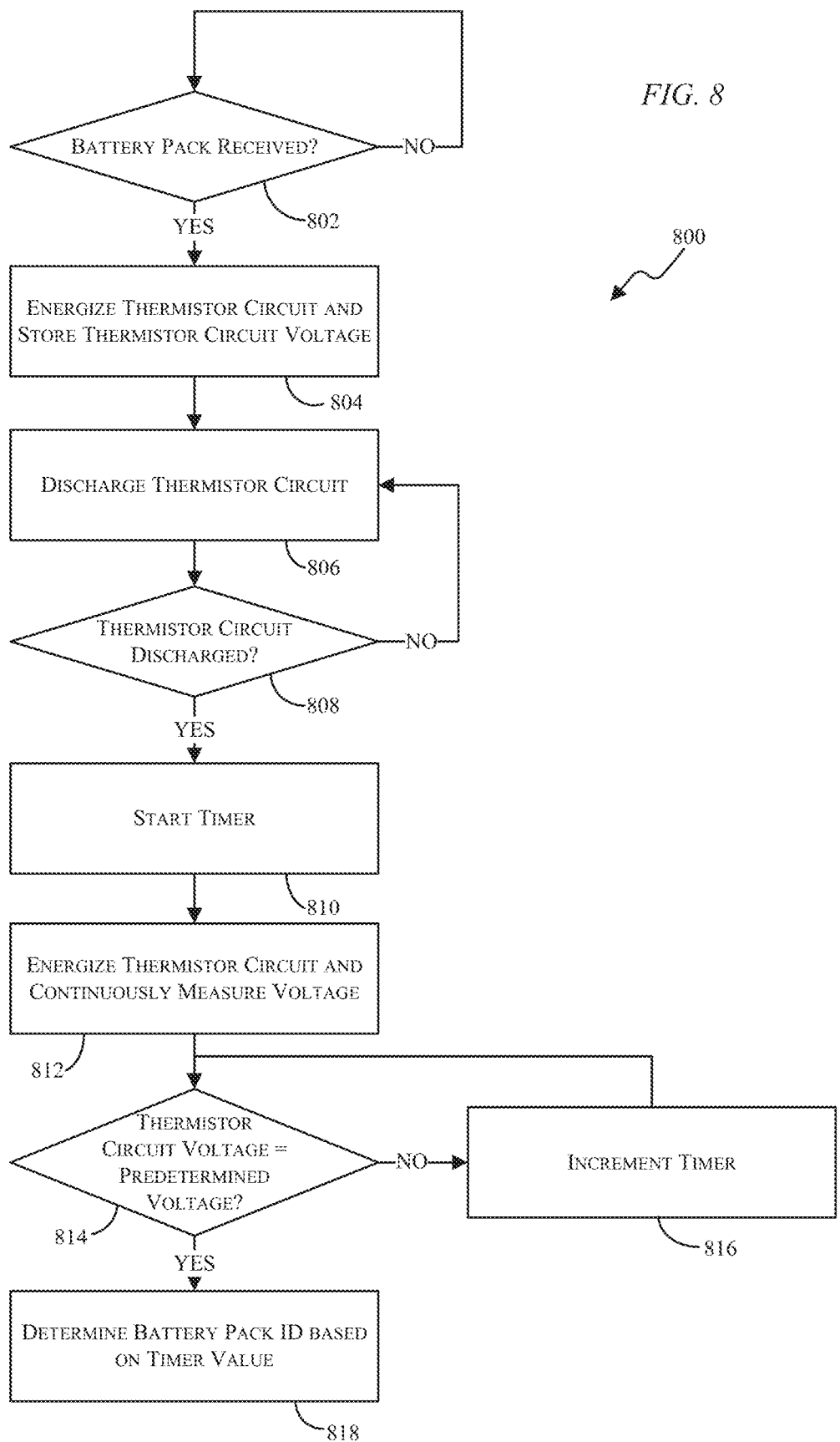

FIG. 8 illustrates a process 800 for determining an identity of the battery pack 700, according to some embodiments. While the process 800 is described in relation to the battery pack 700 and the power tool 702, it is understood that the process 800 is applicable to other battery pack and power tool designs, as would be understood by one having skill in the art. At process block 802, the controller 402 determines whether a battery pack, such as battery pack 700, has been received into a power tool, such as power tool 702. For example, the battery pack 700 may be received into a battery pack interface, such as battery pack interface 415 described above, of the power tool 702. In some embodiments, receiving the battery pack 700 into a power is performed when an electrical and mechanical coupling of the battery pack 700 and the power tool 702 is achieved. However, in other embodiments, receiving the battery pack 700 into the power tool 702 is achieved when the battery pack 700 and the power tool 702 are electrically coupled.

In response to determining that that the battery pack 700 has not been received in the power tool 702, the controller 402 continues monitoring for the battery pack 700 at process block 802. In response to determining that the battery pack 700 has been received, the controller 402 energizes the thermistor circuit 707, and stores a voltage at the output of the thermistor circuit 707, via sensing line or temperature terminal 720, as an initial temperature value. At process block 806, the controller 402 discharges the thermistor circuit 707. For example, the controller 402 may couple the thermistor circuit 707 to ground though the discharge resistor 714. However, other discharging operations are also contemplated. At process block 808, the controller 402 determines whether the thermistor circuit 707 is discharged. In some embodiments, the controller 402 determines whether the thermistor circuit 707 is discharged based on determining if the thermistor circuit 707 has been discharging for a predefined period of time. In some embodiments, the predefined period of time is approximately 5 seconds. However, values or more than 5 seconds or less than 5 seconds are also contemplated. In response to determining that the thermistor circuit 707 is not discharged, the controller 402 continues to discharge the thermistor circuit 707 at process block 806. In response to determining that the thermistor circuit 707 is discharged, the controller 402 starts a timer at process block 810. At process block 812, the controller energizes the thermistor circuit 707 and continuously monitors a voltage of the thermistor circuit 707. For example, the controller 402 monitors the voltage of the thermistor circuit 707 at the temperature terminal 720. As the identification capacitor 706 is in parallel to the thermistor 704, the voltage of the thermistor circuit 707 will ramp up over time based on the capacitance value (F) of the identification capacitor 706 and the discharge resistor 714. For example, the identification capacitor 706 and the discharge resistor 714 determine the time constant ($\tau$). As is understood in the art, after one time constant a capacitor is charged by approximately 63%, and the capacitor is generally considered fully charged after five time constants. The time constant is found based on the following known equation: $\tau = R \times C$, where R is a resistance in ohms and C is a capacitance in Farads. In some embodiments, "continuously monitoring" the voltage means determining the voltage of the thermistor circuit 707 at a predetermined interval (e.g., every 9.5 µsec), to ensure that the voltage determinations are performed quickly enough monitor the charging of the identification capacitor 706. However, time periods of more than 9.5 usec and less than 9.5 usec are also contemplated.

At process block 814, the controller 402 determines whether the thermistor circuit 707 voltage is equal to a predetermined voltage. In one embodiment, the predetermined voltage may be a 63% of the initial temperature value, described above. By using 63% of the initial temperature value as the predetermined voltage, a single time constant of the identification capacitor 706 can be determined. However, in other embodiments, predetermined voltages of more than 63% of the initial temperature value or less than 63% of the initial temperature value are contemplated. In response to determining that the thermistor circuit 707 voltage is not equal to the predetermined voltage, the timer is incremented at process block 816.

In response to determining that the thermistor circuit 707 voltage is equal to the predetermined voltage, the controller 402 determines an identification of the battery pack 700 based on the timer value, at process block 818. In some embodiments, the controller 402 determines the identity of the battery pack 700 by determining the value of the identification capacitor 706 based on the timer value. For example, the time to reach predetermined voltage (e.g., one time constant) can be used to determine the value of the identification capacitor 706 as the value of the discharge resistor 714 is known. The controller 402 may access a lookup table or other database stored in the memory 455 to determine an identity of the battery pack 700 based on the determined value of the identification capacitor 706. In other embodiments, the timer value may be used by the controller 402 to determine the identity of the battery, as the timer value will be different for different identification capacitor 706 values. Upon determining the battery pack identification, the tool 702 and/or charger may modify one or more operations, as described above.

Figure 9:
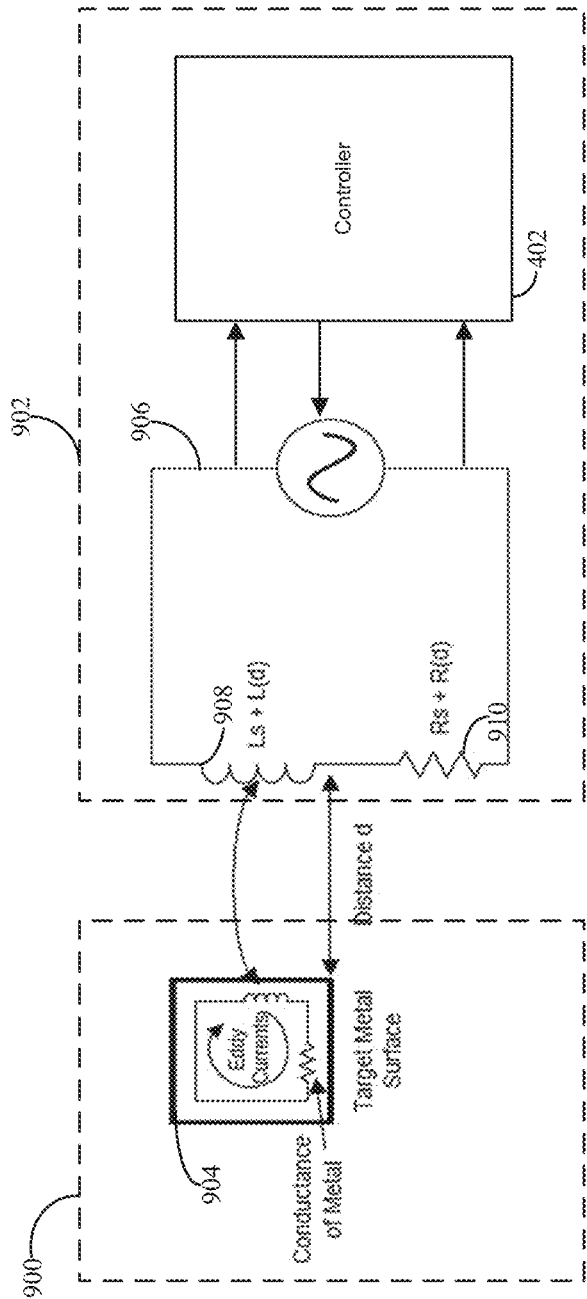
FIG. 9 is a flow chart illustrating a process for identifying a battery pack using the electronic circuitry of FIG. 7, according to some embodiments.

FIG. 9 illustrates an electrical circuit including a battery pack 900, similar to battery pack 100 described above, coupled to a hand-held power tool 902 and configured to determine an identity of the battery pack 900 using an inductive key 904 in the battery pack 900, according to some embodiments. Similarly, the power tool 902 may include similar components to power tool 400 described above. While FIG. 9 is described with regard to the battery pack 900 coupled to a power tool 902, it is contemplated that the battery pack 900 may also be coupled to a battery charger, as described above. The power tool 902 may include a controller 402 and a tank circuit 906, including an inductive element 908 and a resistive element 910. The controller 402 drives the tank circuit 906 which generates a magnetic field which interfaces with the inductive key 904 when the distance between the inductive key 904 and the tank circuit 906 is within a given distance, such as when the battery pack 900 is installed in the power tool 902, as described above. The magnetic field creates an eddy current in the in the inductive key 904, which changes an impedance in the tank circuit 906, thereby allowing the controller 402 to detect the impedance change. In some embodiments, the controller 402 may be in communication with an inductance to digital converter, such as the LDC series inductive to digital converters from TEXAS INSTRUMENTS. The inductive key 904 may include different metallic materials and configurations to vary the amount of the induced eddy currents therein. In some examples, the inductive key 904 may be made from aluminum, steel, copper, etc. Thus, different inductive keys 904 affect the impedance of the tank circuit 906. For examples, material composition, mass, and proximity to the tank circuit 906 can affect the impedance of the tank circuit. Accordingly, the different inductive keys 904 may be used for different battery pack identifications. The controller 402 may include one or more lookup tables or other databases in the memory 455 for associating the different impedance values with different battery pack identifications.

Figure 10A:
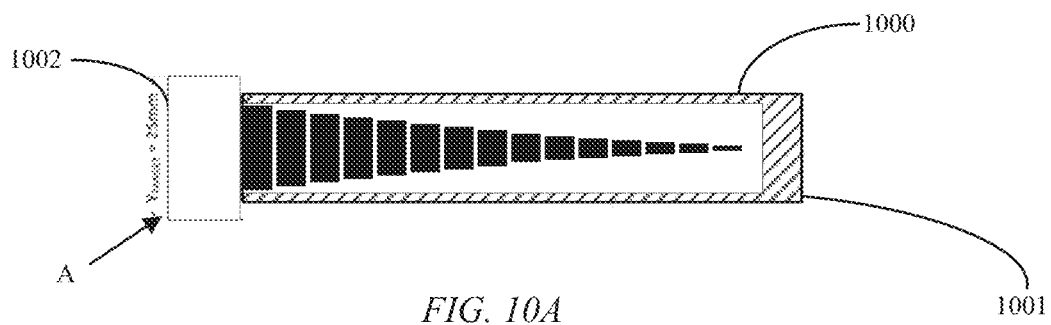
FIGS. 10A-10C illustrate electronic circuitry for identifying a battery pack using inductive coupling, according to some embodiments.
Figure 10B:
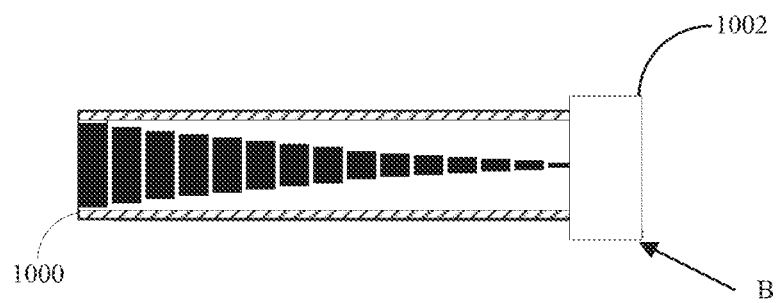
Figure 10C:
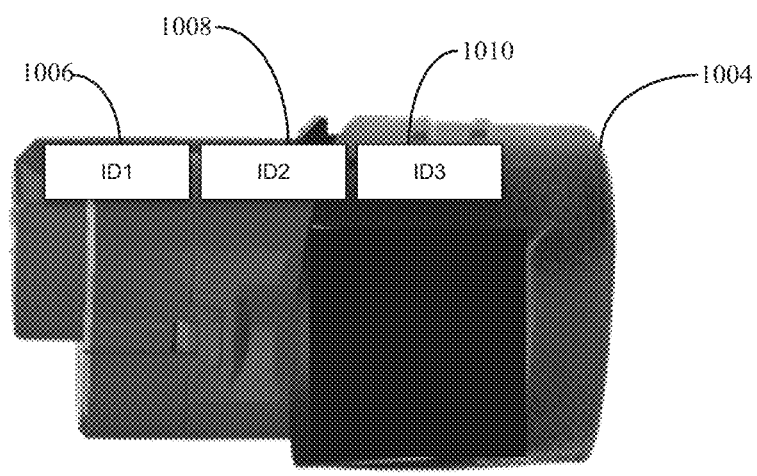

FIGS. 10A-10C illustrate an alternative electrical circuit to that described in FIG. 9, wherein in FIGS. 10A and 10B, an elongated coil 1000 of a tank circuit 1001 (similar to tank circuit 906 described above), within the power tool 902 is shown, according to some embodiments. The elongated coil 1000 tapers in a lateral direction, thereby causing the turns within the elongated coil 1000 to become more compressed as the elongated coil 1000 tapers. As the turns are more compressed, a field line density generated by the tank circuit 1001 becomes denser. As shown in FIG. 10A, an inductive key 1002 is positioned at position A above the elongated coil 1000. As the field line density is lowest at position A due to the larger separation of the coil turns, a first impedance change is detected by a controller, such as controller 402, thereby providing an identification of a battery pack associated with the inductive key 1002 at the first position A. As shown in FIG. 10B, the inductive key 1002 is positioned at position B above the elongated coil 1000. As the field line density is highest at position B due to the smaller separation of the coil tuns, a second impedance change is detected by the controller, thereby providing an identification of a battery pack associated with the inductive key 1002 at the second position B.

FIG. 10C shows a battery pack 1004, similar to battery pack 100 described above, having different inductive key positions 1006, 1008, and 1010. By having three possible locations for the inductive keys 1006, 1008, 1010, three different identification values may be provided for different battery packs based on which inductive key is installed in the battery pack. For example, a battery pack with the inductive key 1006 installed will affect a different impedance change in the tank circuit 1001 than a battery pack with the inductive key 1008 or the inductive key 1010 installed, due to their relative position to the elongated coil 1000. Each resulting impedance change may be associated with a battery pack identification within the controller 402. While the example shown in FIG. 10C shows three possible positions for the inductive key, it is contemplated one or more inductive keys could be placed in more than three positions, and along all three axes to allow for multiple identifications to be determined by the controller 402.

Figure 11:
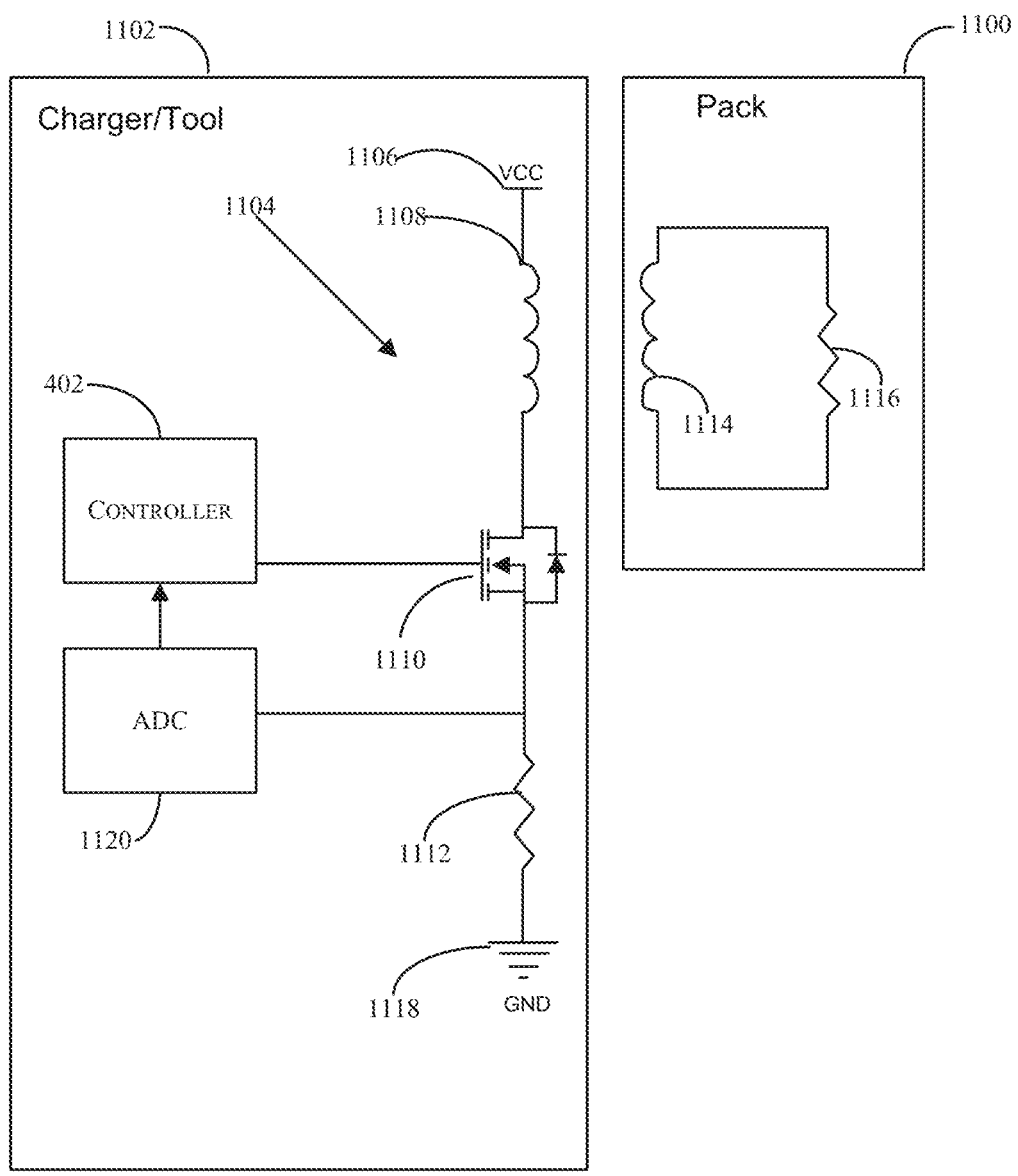
FIGS. 11-12 illustrated electronic circuitry for identifying a battery pack using inductive identification circuits, according to some embodiments.

FIG. 11 illustrates an alternative electrical circuit including a battery pack 1100, similar to battery pack 100, coupled to a hand held power tool 1102 and/or battery charger and configured to determine an identity of the battery pack 1100 using inductive coupling, according to some embodiments. In some examples, the power tool 1102 may include similar components to power tool 400 described above. The power tool 1102 includes a controller 402 and an inductive coupling circuit 1104, including a common voltage 1106, a primary winding 1108, a switch 1110, and a current sensing resistor 1112. The battery pack 1100 includes, in addition to the components described above in regards to battery pack 100, a secondary winding 1114 and a resistive load 1116. Upon the battery pack 1100 being installed into the power tool 1102, the controller 402 may turn switch 1110 ON, thereby creating a circuit between the common voltage 1106 and a ground connection 1118. In some embodiments, the switch 1110 is a solid-state switch, such as a field effect transistor (FET) or other transistor type. In other embodiments, the switch 1110 may be a mechanical switch such as a relay, a reed switch, etc. As current flows through the primary winding 1108 a magnetic field is inducted, which couples with the secondary winding 1114, provided the secondary winding 1114 is in proximity to the primary winding 1108. The magnetic field induces a voltage in the secondary winding 114 which generates a current through the load 1116. Depending on a value of the load 1116, the current through the secondary winding 1114 changes, which in turn affects the impedance of the primary winding 1108 (i.e., increases the current flow through the primary winding 1108 creating a greater voltage drop across the primary winding 1108). This change in impedance of the primary winding 1108 affects the current flow across the current sensing resistor 1112, which is provided to an analog to digital converter 1120 that in turn communicates a digital value equal to the detected current value to the controller 402. The controller 402 may access a lookup table or other database in the memory 455 to determine an identity of the battery pack 1100 based on the sensed current. Accordingly, by changing the load 1116 value, an identity of the battery pack 1100 may be changed, and subsequently determined by the controller 402 based on the change of current within the inductive coupling circuit 1104.

Figure 12:
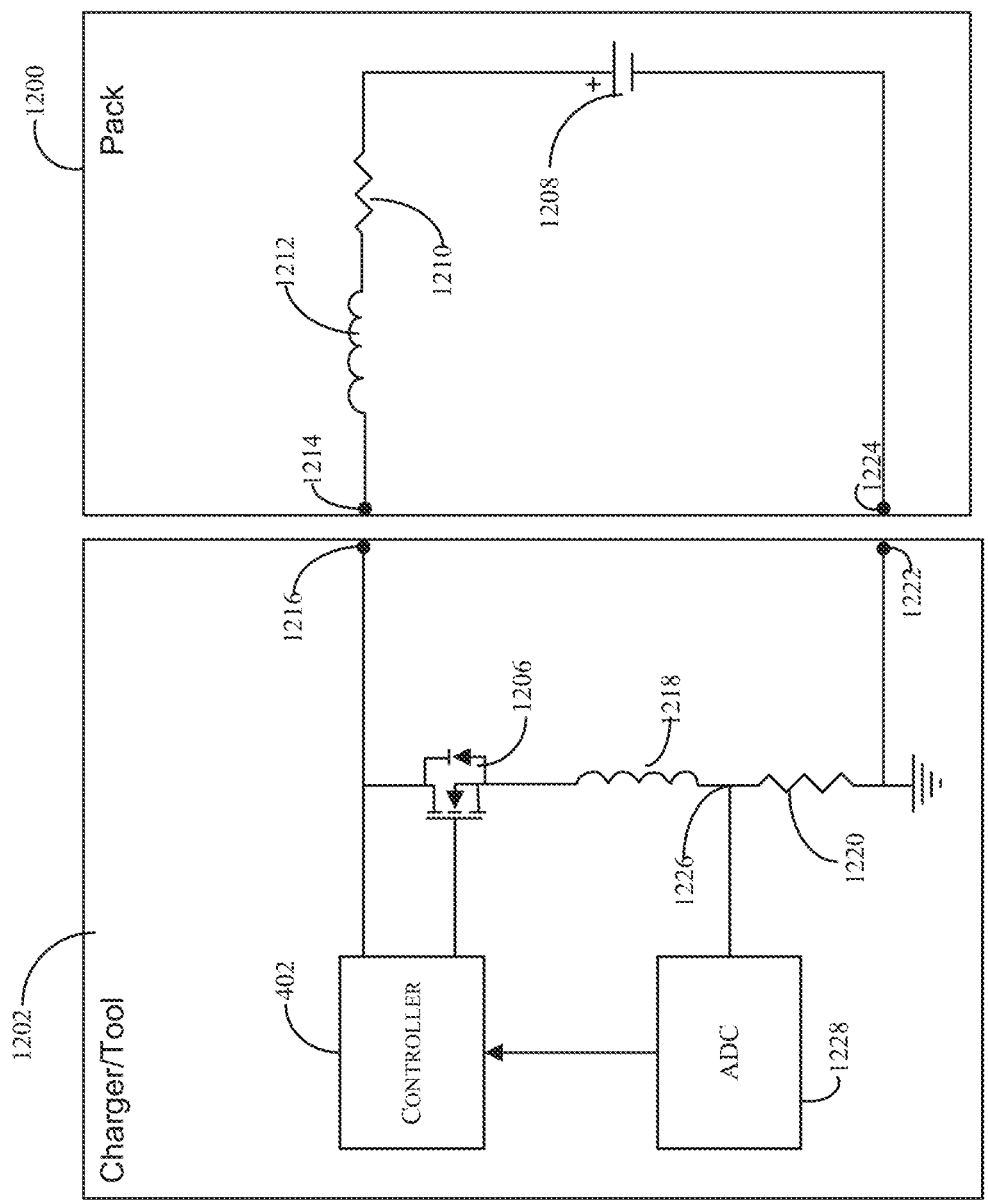

FIG. 12 illustrates an alternative electrical circuit including a battery pack 1200, similar to battery pack 100, coupled to a hand held power tool 1202 and/or battery charger and configured to determine an identity of the battery pack 1200 using inductive sensing, according to some embodiments. In some examples, the power tool 1102 may include similar components to power tool 400 described above. The power tool 1202 includes a controller 402 coupled to a switch 1206. In some embodiments, the switch 1206 is a solid-state switch, such as a MOSFET. However, other switch types are also contemplated. The controller 402 is configured to drive the switch 1206 at a fixed frequency. When the switch is in a "closed" state, current from a battery cell 1208 (similar to battery cells 115 described above) flows through a cell tap resistor 1210, a battery pack inductor 1212, and into the power tool 1202 via terminals 1214 and 1216. The current then flows through the switch 1206, a power tool inductor 1218, and a current sense resistor 1220. The current flows back to the battery cell 1208 via negative terminals 1222 and 1224. In one embodiment the values of the battery pack inductor 1212 and the power tool inductor 1218 are known, and the value of the cell tap resistor 1210 is used to identify the battery pack 1200. For example, the controller 402 may drive switch 1206 at a resonant frequency of the battery pack inductor 1212 and the power tool inductor 1218, and then senses the voltage at sensing point 1226 caused by the voltage-divider created between the cell tap resistor 1210 and the current sense resistor 1220. An analog-to-digital converter (ADC) 1228 may convert the analog voltage at sensing point 1226 and provide the voltage as a digital signal to the controller 402. The controller 402 may then access one or more lookup tables and/or databases in the memory 455 to determine an identity of the battery pack 1200 based on the sensed voltage. Accordingly, by modifying the resistance value of the cell tap resistor 1210, different battery identifications can be provided. In response to determining the identity of the battery pack 1200, one or more operations of the power tool and/or charger 1202 may be modified.

Figure 13:
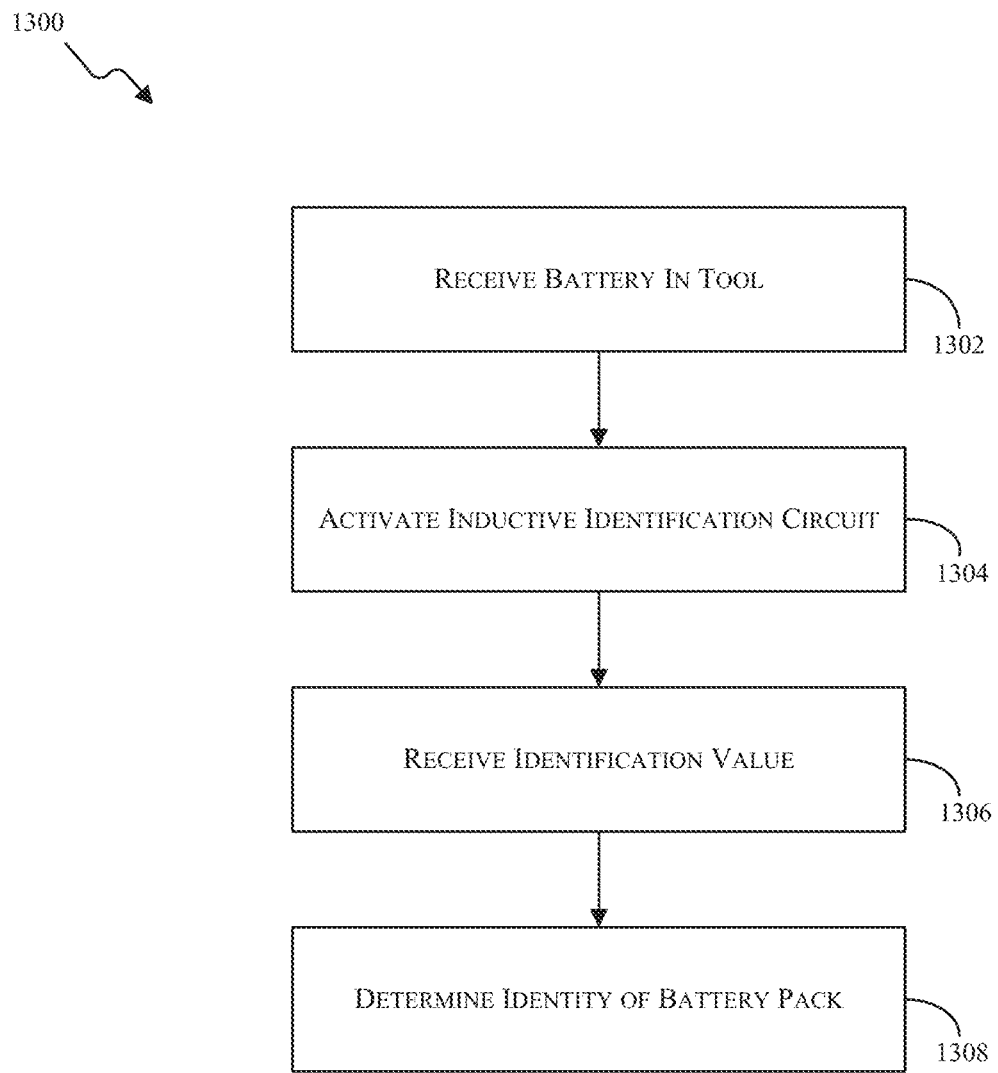
FIG. 13 is a flow chart illustrating a process for identifying a battery pack using the electronic circuitry of FIGS. 10-12, according to some embodiments.

FIG. 13 illustrates a process 1300 for determining an identity of a battery pack using one of the inductive sensing implementations shown in FIGS. 9-12, according to some embodiments. At process block 1302, a battery pack such as battery pack 900, 1004, 1100, 1200, is received into a power tool and/or battery charger, such as described above. In some embodiments, receiving the battery pack 900, 1004, 1100, 1200 into a power tool and/or charger may be when an electrical and a mechanical coupling of the battery pack 900, 1004, 1100, 1200 and the power tool and/or charger is achieved. However, in other embodiments, receiving the battery pack 900, 1004, 1100, 1200 into a power tool and/or charger may be when an electrical coupling of the battery pack 900, 1004, 1100, 1200 and the power tool and/or charger is achieved. At process block 1304, a controller 402 of the power tool and/or charger activates an inductive identification circuit as described above. Upon activating the inductive identification circuit, an identification value is received by the controller 402, as described above with regard to the inductive identification circuits of FIGS. 9-12. At process block 1308, the controller 402 determines an identity of the battery pack 900, 1004, 1100, 1200 based on the received identification value. For example, the controller 402 may compare the received identification value with known identification values stored in lookup tables or other databases stored in a memory 455 of the controller 402. In response to determining the identity of a battery pack, the controller 402 can modify one or more operations of the power tool and/or charger.

Figure 14:
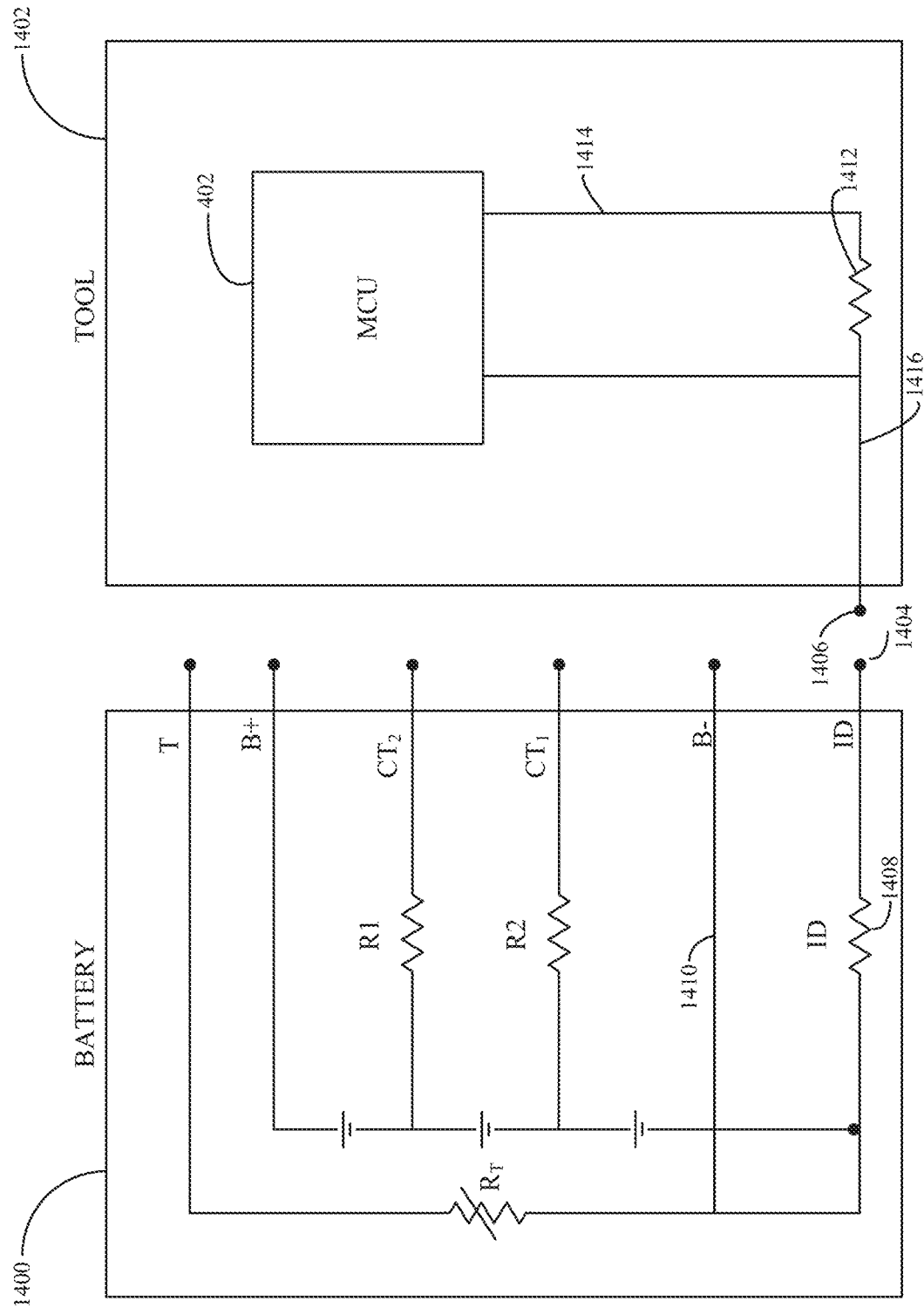
FIG. 14 illustrates electronic circuitry for identifying a battery pack via a dedicated terminal, according to some embodiments.

FIG. 14 illustrates an alternative circuit for determining an identity of a battery pack 1400, according to some embodiments. The battery pack 1400 is coupled to a power tool and/or charger 1402, similar to those described above. The battery pack 1400 may be similar to the battery pack 100 described above. The battery pack 1400 may include an additional identification terminal 1404 that couples to an identification terminal 1406 on the power tool 1402. An identification resistor 1408 is coupled to the negative battery terminal 1410. The identification resistor 1408 is configured to have a resistance value associated with an identity of the battery pack 1400.

The controller 402 couples a voltage to a dividing resistor 1412 via output 1414. Upon the controller coupling the voltage to the dividing resistor 1412 an identification voltage is sensed via sensing line 1416 which is provided back to the controller 402. While not shown, it is contemplated that an analog-to-digital converter may convert the identification voltage into a digital signal for processing by the controller 402. The identification voltage is based on the voltage output by the controller 402 divided by the dividing resistor 1412 and the identification resistor 1408. As the value of the dividing resistor 1412 is known, as well as the voltage output by the controller 402, the identification voltage only varies based on the resistance value of the identification resistor 1408. The controller 402 is configured to determine an identity of the battery pack 1400 based on the identification voltage. For example, the controller 402 may access one or more lookup tables and/or databases stored in the memory 455 to determine an identity of the battery pack 1400 based on the determined identification voltage. For example, the lookup table and/or databases may have a number of identification voltage values that are associated with an identity of a battery pack. Upon determining the battery pack identification, the power tool and/or charger 1402 may modify one or more operations based on the determined identity, as described above.

Figure 15:
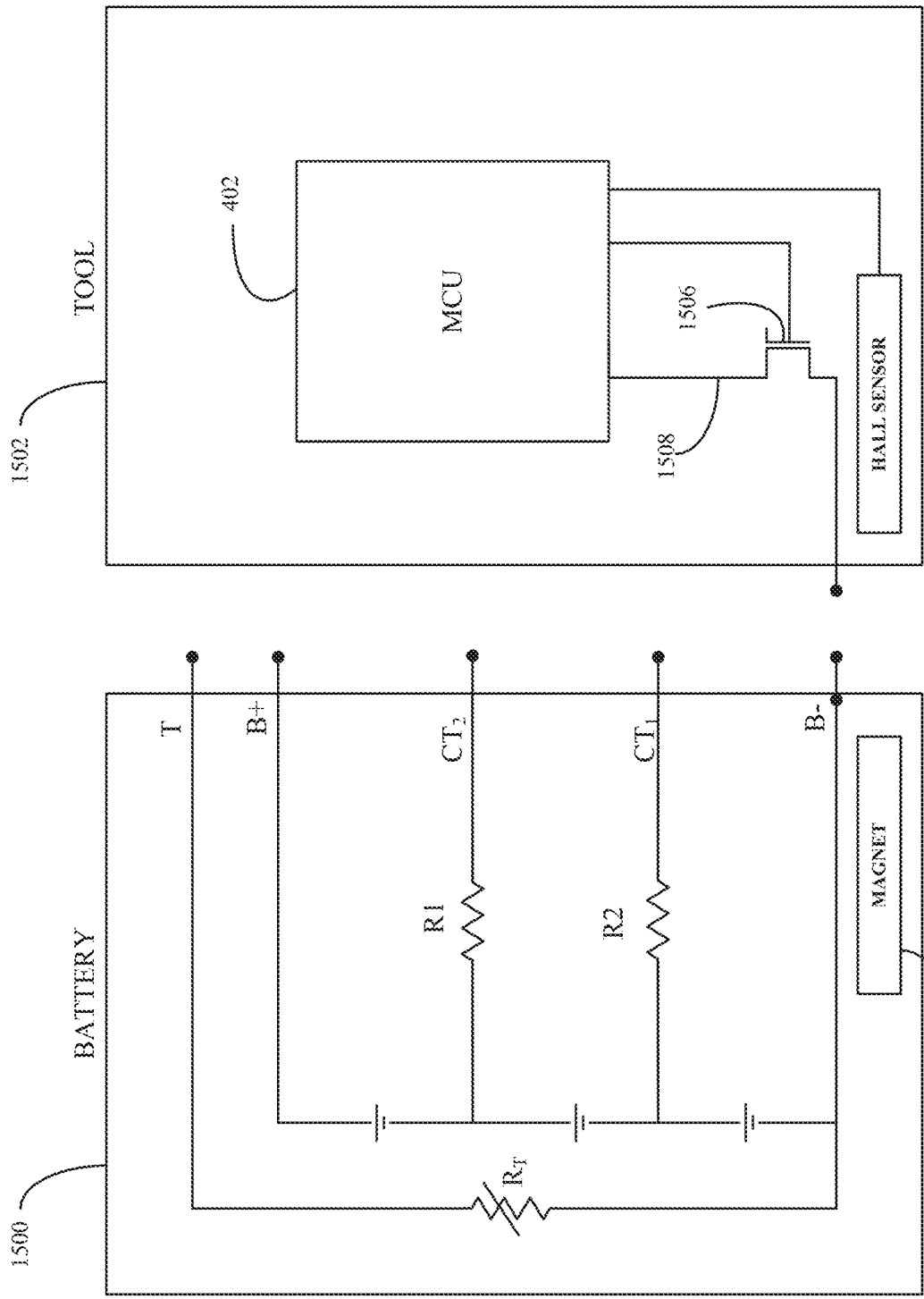
FIG. 15 illustrates electronic circuitry for identifying a battery pack via a hall sensor, according to some embodiments.

FIG. 15 illustrates an alternative circuit for determining an identity of a battery pack 1500, according to some embodiments. The battery pack 1500 is coupled to a power tool and/or battery charger 1502, similar to those described above. The battery pack 1500 may be similar to the battery pack 100 described above. The battery pack 1500 includes a magnet 1504 in addition to the circuitry described above with regard to battery pack 100. The power tool 1502 includes a controller 402 and a Hall effect sensor 1506 coupled to the controller 402. The Hall effect sensor 1506 is configured to generate an output that is provided to the controller 402 via input line 1508. The Hall effect sensor 1506 is configured to produce an output that varies based on the magnetic field generated by the magnet 1504. The magnetic field generated by the magnet 1504 may vary based on a position of the magnet 1504 within the housing and the relational position to the Hall effect sensor 1506. The controller 402 is configured to receive the output of the Hall effect sensor 1506 via the input line 1508. While not shown, an analog-to-digital converter may receive the output of the Hall effect sensor 1506 and provide a digital value of the output from the hall effect sensor 1506 to the controller 402. For example, the Hall effect sensor 1506 may output a voltage value between 0 and 5V. However, other output values are contemplated.

The controller 402 is configured to determine an identity of the battery pack 1500 based on the output from the Hall effect sensor 1506. As described above, the output from the Hall effect sensor 1506 varies based on the magnetic field produced by the magnet 1504. Accordingly, the battery pack 1500 may position the magnet 1504 in different locations within the housing that correspond to different battery pack identifications. The controller 402 may access one or more lookup tables and/or databases stored in the memory 455 to determine an identity of the battery pack 1500 based on the output from the Hall effect sensor 1506. For example, the lookup table and/or databases may have a number of output values that are associated with an identity of a battery pack. Upon determining the battery pack identification, the power tool and/or charger 1502 may modify one or more operations based on the determined identity, as described above.

Figure 16:
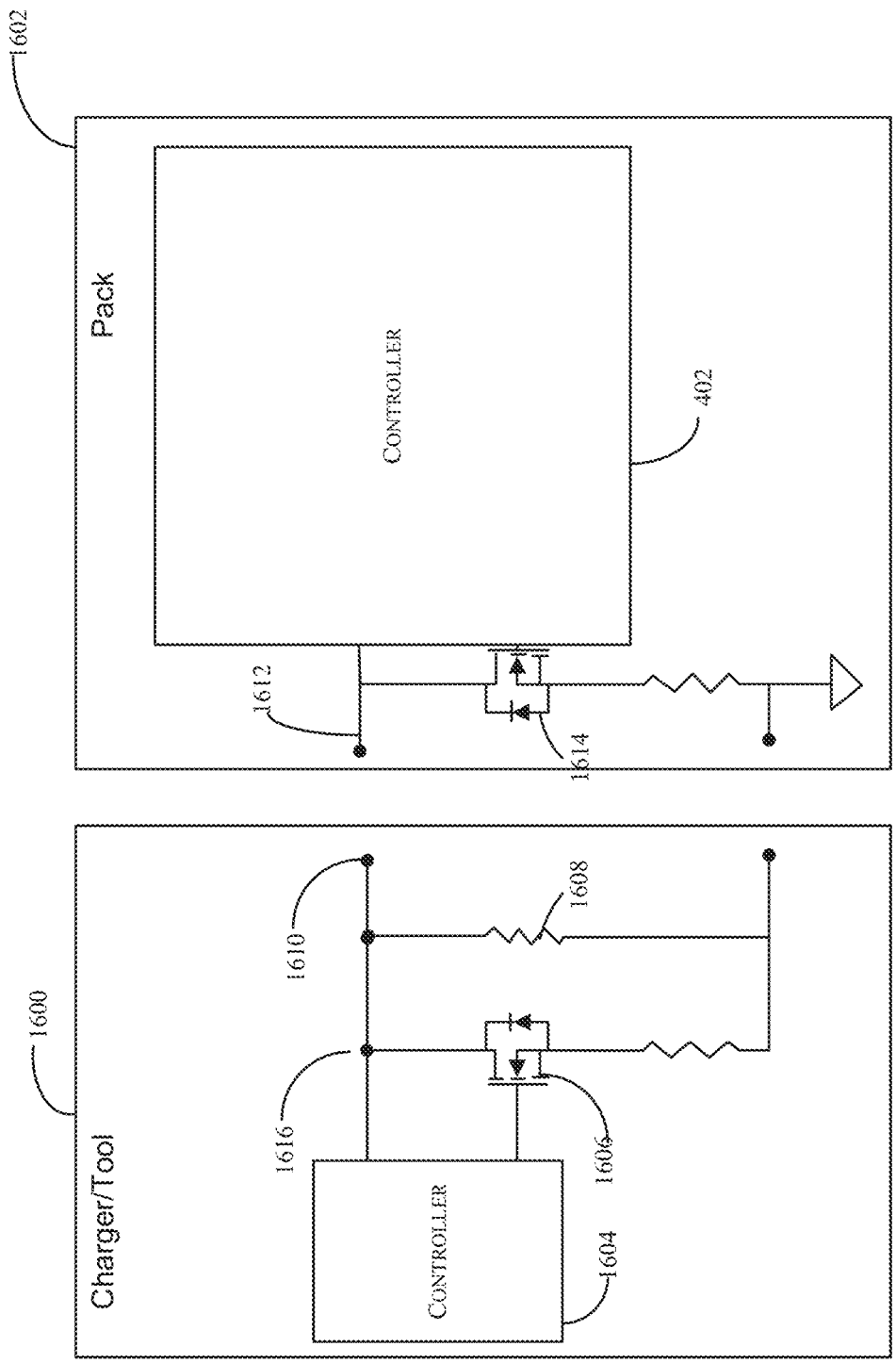
FIG. 16 illustrates electronic circuitry for identifying a battery pack via single line communication, according to some embodiments.

FIG. 16 illustrates an alternative circuit for determining an identity of a battery pack 1600, according to some embodiments. The battery pack 1600 is coupled to a power tool and/or battery charger 1602, similar to those described above. The battery pack 1600 may be similar to the battery pack 100 described above. The battery pack 1600 includes a controller 1604 coupled to a switch 1606 in parallel with a thermistor 1608. The controller 1604 is coupled to a temperature terminal 1610, which couples to a tool temperature terminal 1612 of the power tool 1602. The controller 402 of the power tool 1602 is coupled to the tool temperature terminal 1612 and a switch 1614. The controller 1604 is configured to operate the switch 1606 to allow the controller 1604 to output a signal to the temperature terminal 1610. By activating the switch 1606 a voltage placed on an input/output line 1616 of the controller 1604 will be transmitted to the power tool 1602 via the temperature terminal 1610. In some embodiments, the controller 1604 is configured to output a series of voltage pulses indicating a battery identification value. By deactivating the switch, a voltage may be provided to the temperature terminal 1610 by the controller 402, which is then received by the controller 1604 via the input/output line 1616. The controller 402 may output other signals by switching a voltage that is normally provided to the thermistor 1608. However, in other examples, the controller 402 may output other voltages to indicate to the controller 1604 that a message is being transmitted. Similarly, the controller 402 can activate the switch 1614 to perform similar send and receive operations as the controller 1604. Thus, the controllers 1604, 402 may transmit data via the temperature terminals 1610, 1612. The switches 1606, 1614 may be solid state switches, such as FETs. However, other switch types are also contemplated.

Accordingly, the controller 1604 of the battery pack 1600 can provide identification to the controller 402 of the power tool 1602 using the communication methods described above. In some embodiments, the controller 402 is configured to determine an identity of the battery pack 1600 based on the battery identification value output by the controller 1604. Upon determining the battery pack identification, the power tool and/or charger 1602 may modify one or more operations based on the determined identity, as described above.

Figure 17:
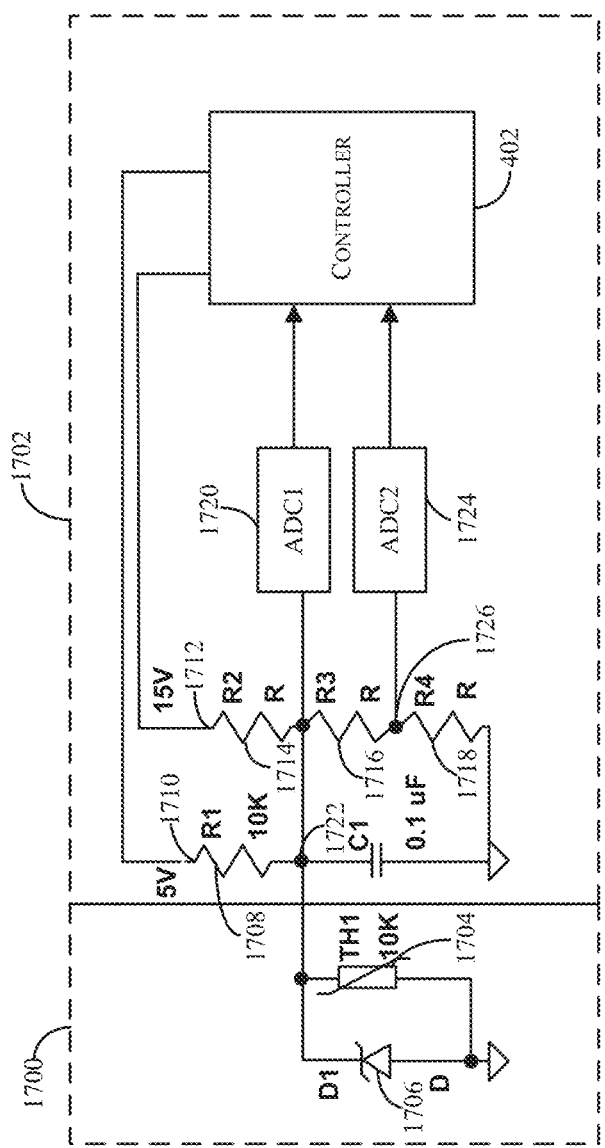
FIG. 17 illustrates electronic circuitry for identifying a battery pack via a Zener diode arrangement, according to some embodiments.

FIG. 17 illustrates an alternative circuit for determining an identity of a battery pack 1700, according to some embodiments. The battery pack 1700 is coupled to a power tool and/or battery charger 1702, similar to those described herein. The battery pack 1700 includes a thermistor 1704 in parallel with a Zener diode 1706. With the exception of the components described above, the battery pack 1700 may include similar components to battery pack 100 described above. The power tool 1702 may include a first resistor 1708 coupled to a first power supply 1710. In one example, the first power supply 1710 is configured to output a 5V output. However, outputs of more than 5V or less than 5V are also contemplated. The power tool 1702 also includes a second power supply 1712 coupled to a resistor network including resistive elements 1714, 1716, 1718. The second power supply 1712 is configured to output a 15V output. However, outputs of more than 15V or less than 15V are also contemplated. The power tool 1702 further includes an analog to digital converter 1720 coupled to a first connection point 1722 and a second analog to digital converter 1724 coupled to a second connection point 1726. The analog to digital converters are coupled to a controller 402. The controller 402 is coupled to the power supplies for 1710, 1712 for controlling their operation.

Figure 18:
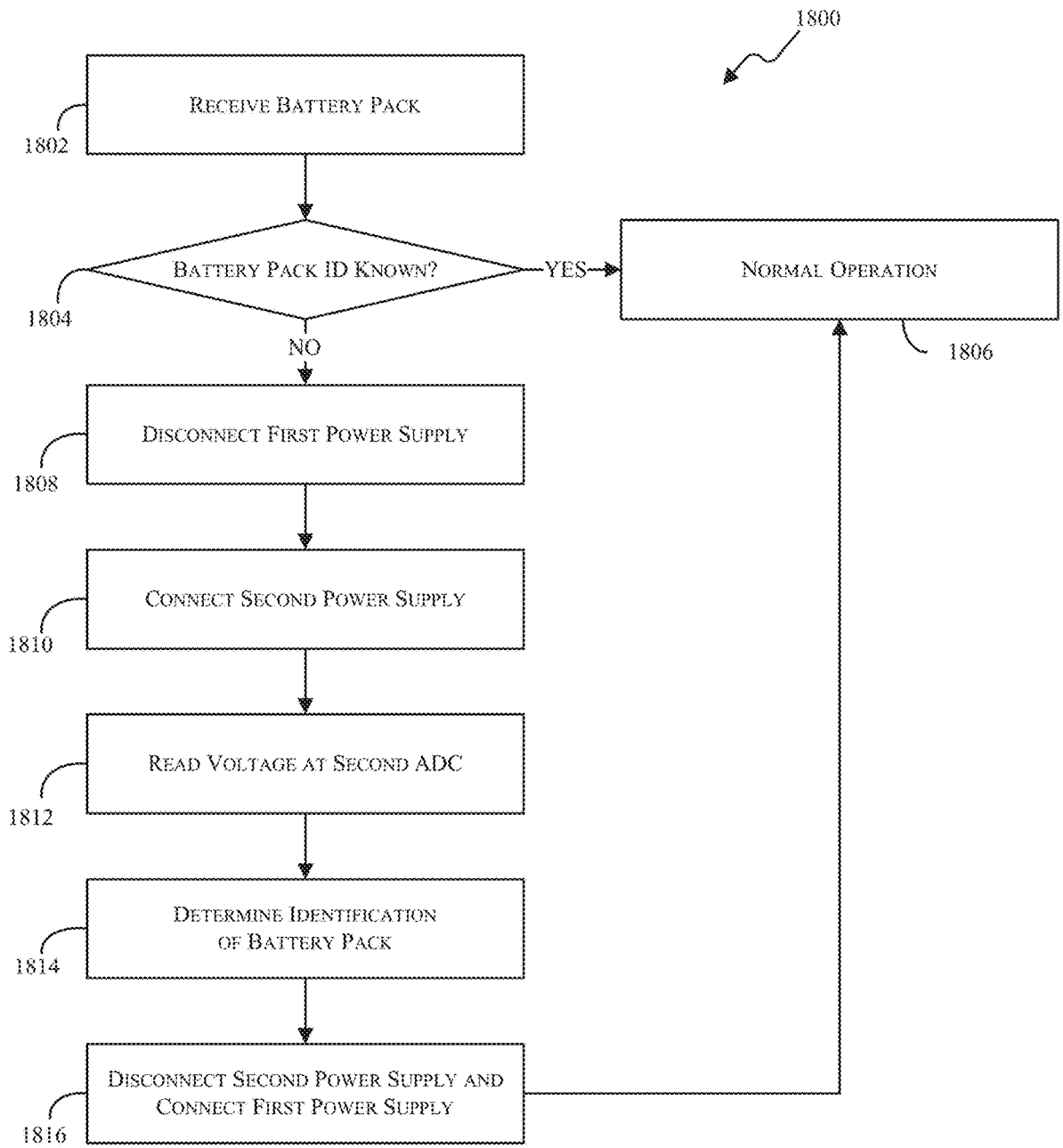
FIG. 18 is a flow chart illustrating a process for identifying a battery pack using the electronic circuitry of FIG. 17, according to some embodiments.

FIG. 18 illustrates a process 1800 for determining an identity of the battery pack 1700, according to some embodiments. At process block 1802, a battery pack, such as battery pack 100, is received into the power tool 1702. At process block 1804 the controller 402 determines whether the identification of the battery pack 1700 is known. In response to determining that the identification of the battery pack 1700 is known, the controller 402 operates normally at process block 1806. In response to determining that the identification of the battery pack 1700 is not known, the controller disconnects the first power supply 1710 at process block 1808. Disconnecting the first power supply 1710 may include instructing the power supply 1710 to stop providing an output. In other embodiments, disconnecting the first power supply 1710 includes activate one or more switches (not shown) to disconnect the output of the first power supply 1710. At process block 1810, the second power supply 1712 is connected to resistive element 1714. The output of the second power supply 1712 is higher than the first power supply 1710 and is divided between resistive element 1714 and the combination of resistive elements 1716 and 1718. This divided voltage is applied to the first connection point 1722, and thereby to the battery pack 1700. The voltage present at the first connection point 1722 is sufficient to overcome the breakdown voltage of the Zener diode 1706. Upon overcoming the breakdown voltage of the Zener diode 1706, the voltage at connection point 1722 is equal to the breakdown voltage of the Zener diode 1706. At process block 1814, the controller reads a voltage at connection point 1726 as provided by the second analog to digital converter 1724. This voltage is equal to the Zener diode 1706 breakdown voltage divided by the resistive element 1716 and the resistive element 1718.

At process block 1814, the controller 402 determines an identification of the battery pack 1700 based on the voltage present at the connection point 1726. As the voltage at connection point 1726 is based on the breakdown voltage of the Zener diode 1706, different battery packs may use Zener diodes with different breakdown voltages that may be associated with an identification of their associated battery packs. The controller 402 may access one or more lookup tables and/or databases stored in the memory 455 to determine an identity of the battery pack 1700 based on the voltage at connection point 1726. For example, the lookup table and/or databases may have a number of voltage values that are associated with an identity of a battery pack. At process block 1816, the second power supply 1712 is disconnected and the first power supply 1710 is reconnected. The power tool 1702 then returns to normal operation at process block 1806.

Figure 19:
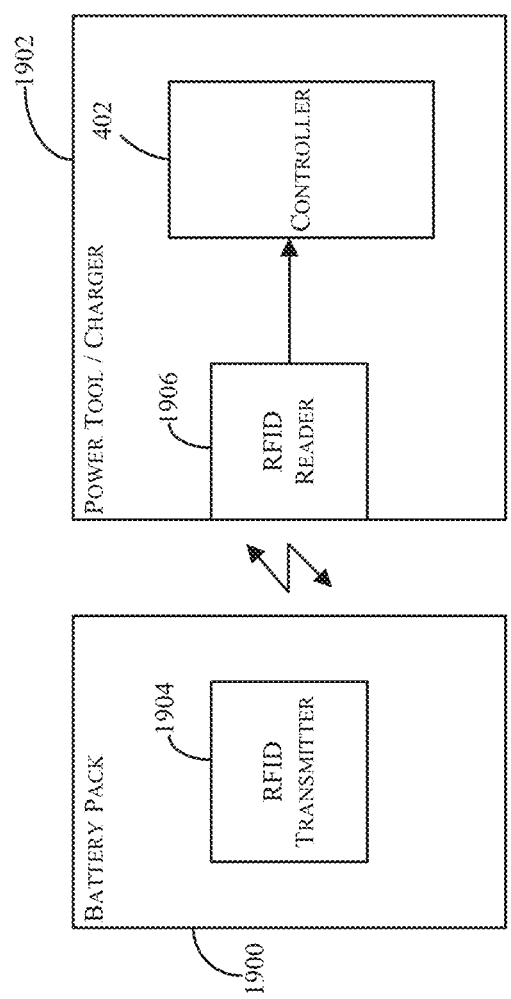
FIG. 19 illustrates electronic circuitry for identifying a battery pack via RFID, according to some embodiments.

FIG. 19 illustrates an alternative circuit for determining an identity of a battery pack 1900, according to some embodiments. The battery pack 1900 is coupled to a power tool and/or battery charger 1902, similar to those described herein. The battery pack 1900 includes an RFID transmitter 1904. The power tool 1902 includes a controller 402 coupled to an RFID reader 1906. Upon the battery pack 1900 being received in the power tool 1902, the RFID reader 1906 may request data from the RFID transmitter 1904. In some embodiments, the RFID transmitter 1904 may transmit an identification of the battery pack 1900 to the RFID reader 1906, which is then communicated to the controller 402. In other embodiments, the RFID transmitter 1904 may transmit various other parameters of the battery pack to the RFID reader 1906. Parameters such as charging temperature, voltage, discharge/charge current levels, etc. may be provided to the RFID reader 1906 and then to the controller 402. In response to receiving the identification and/or one or more parameters associated with the battery pack 1900, the controller 402 may modify an operation of the power tool and/or charger 1902 based on the battery pack 1900 information.

In still other embodiments, one or more mechanical features or keys may be applied to the casing of a battery pack, such as casing 105 of battery pack 100, such that certain battery pack types would not be capable of being received within certain power tools or battery chargers.

Thus, embodiments described herein provide, among other things, a battery pack for a battery powered power tool with identifying components or other circuitry for allowing a power tool and/or charger to identify the battery pack. Based on that identification, the power tool and/or battery charger can modify one or more operational parameters to optimize operation of the power tool and/or battery charger.

What is claimed is:

1. A battery pack system comprising:
   a battery pack including:
   one or more battery cells, and
   a first resistive element connected to a positive electrode of a first battery cell of the one or more battery cells; and
   an external device capable of receiving the battery pack, the external device including:
   a second resistive element configured to be in series with the first resistive element upon the battery pack being received by the external device,
   a switch positioned in series with the second resistive element and a common potential coupled to both the battery pack and the external device, and
   a controller configured to:
   activate the switch,
   measure a voltage between the first resistive element and the second resistive element in response to the switch being activated, and
   determine an identification, including the power capacity, of the battery pack based on the measured voltage, wherein the identification includes a power capacity of the battery pack.

2. The battery pack system of claim 1, wherein the external device is a battery pack powered power tool.

3. The battery pack system of claim 1, wherein the external device is a battery pack charger.

4. The battery pack system of claim 1, wherein the controller is further configured to modify one or more operational parameters of the external device in response to determining the identification of the battery pack.

5. The battery pack system of claim 4, wherein the one or more operational parameters include a charging current provided to the battery pack.

6. The battery pack system of claim 1, wherein the one or more battery cells are lithium-ion battery cells.

7. A battery pack system comprising:
 a battery pack including:
  one or more battery cells,
  a thermistor, and
  a capacitor connected in parallel with the thermistor; and
 an external device configured to receive the battery pack, the external device including:
  a resistive element configured to be in series with the thermistor and the capacitor upon the battery pack being received by the external device, and
  a controller configured to:
   provide a first current to the resistive element, the thermistor, and the capacitor,
   measure a voltage between the resistive element and the thermistor,
   determine a time for the voltage to exceed a predetermined threshold, and
   determine an identity of the battery pack based on the determined time.

8. The battery pack system of claim 7, wherein the time is associated with a time constant of the capacitor.

9. The battery pack system of claim 7, wherein the identity of the battery pack is based on a capacitance value of the capacitor.

10. The battery pack system of claim 7, wherein, prior to providing the current to the resistive element, the controller is configured to determine whether the capacitor is discharged.

11. The battery pack system of claim 10, wherein the controller is configured to determine whether the capacitor is discharged based on the capacitor being in a discharge state for a predetermined period of time.

12. The battery pack system of claim 7, wherein the controller is further configured to:
 provide a second current to the thermistor and the capacitor prior to starting a timer;
 determine an initial voltage of the capacitor and the thermistor prior to starting the timer;
 store the initial voltage;
 discharge the capacitor and thermistor;
 determine whether the capacitor and thermistor have been discharged; and
 start the timer in response to the capacitor and thermistor being determined to be discharged.

13. The battery pack system of claim 12, wherein the predetermined threshold is a percentage of a full capacitor voltage.

14. The battery pack system of claim 13, wherein the percentage of the full capacitor voltage is approximately 63% of the full capacitor voltage.

15. The battery pack system of claim 7, wherein the external device is one of a battery pack powered power tool and a battery charger.

16. A battery pack comprising:
 an identification circuit configured to provide an indication of an identity of the battery pack to an external device configured to be electrically coupled to the battery pack, the identification circuit including:
  an inductive key configured to control an eddy current of a tank circuit of the external device in response to the battery pack being coupled to the external device, a property of the inductive key is used to control the eddy current generated by the tank circuit, the eddy current is operable to vary the impedance of the tank circuit and the impedance of the tank circuit can be used to identify the battery pack,
 wherein the battery pack has a nominal voltage output of less than 18 V.

17. The battery pack of claim 16, wherein:
 the identification circuit includes a magnet configured to generate a magnetic field;
 the magnetic field is measurable by a sensor of the external device; and
 the magnetic field provides the identity of the battery pack.

18. The battery pack of claim 17, wherein a position of the magnet indicates the identity of the battery pack.

19. The battery pack of claim 16, wherein the property of the inductive key is at least one selected from the list consisting of: a material of the inductive key, a mass of the inductive key, and a position of the inductive key.

* * * * *